(12) United States Patent
Fletcher et al.

(10) Patent No.: US 10,480,537 B2
(45) Date of Patent: Nov. 19, 2019

(54) LOW-COST EVACUATOR FOR AN ENGINE HAVING TUNED VENTURI GAPS

(71) Applicant: Dayco IP Holdings, LLC, Troy, MI (US)

(72) Inventors: David E. Fletcher, Flint, MI (US); Brian M. Graichen, Leonard, MI (US); James H. Miller, Ortonville, MI (US); Rex Bravo, Detroit, MI (US); Matthew C. Gilmer, Whitmore Lake, MI (US); Keith Hampton, Ann Arbor, MI (US); Andrew D. Niedert, New Hudson, MI (US); Denis Vashuk, Saint Clair Shores, MI (US)

(73) Assignee: Dayco IP Holdings, LLC, Troy, MI (US)

(*) Notice: Subject to any disclaimer, the term of this patent is extended or adjusted under 35 U.S.C. 154(b) by 0 days.

(21) Appl. No.: 16/374,136

(22) Filed: Apr. 3, 2019

(65) Prior Publication Data

US 2019/0234430 A1 Aug. 1, 2019

Related U.S. Application Data

(63) Continuation of application No. 14/830,864, filed on Aug. 20, 2015, now Pat. No. 10,273,978.

(60) Provisional application No. 62/042,568, filed on Aug. 27, 2014, provisional application No. 62/042,569, filed on Aug. 27, 2014, provisional application No. (Continued)

(51) Int. Cl.
*F04F 5/22* (2006.01)
*F04F 5/46* (2006.01)
*F02M 35/10* (2006.01)
*F04F 5/00* (2006.01)
*F04F 5/20* (2006.01)

(52) U.S. Cl.
CPC ........ *F04F 5/467* (2013.01); *F02M 35/10157* (2013.01); *F02M 35/10229* (2013.01); *F04F 5/00* (2013.01); *F04F 5/20* (2013.01); *F04F 5/22* (2013.01); *F04F 5/46* (2013.01); *F04F 5/466* (2013.01); *Y02T 10/144* (2013.01)

(58) Field of Classification Search
CPC ...... F04F 5/467; F04F 5/22; F04F 5/46; F04F 5/20; F04F 5/00; F04F 5/466; F02M 35/10229; F02M 35/10157; Y02T 10/144
See application file for complete search history.

(56) References Cited

U.S. PATENT DOCUMENTS

| | | | | |
|---|---|---|---|---|
| 380,907 A * | 4/1888 | Marty | ....................... | F04F 5/22 417/174 |
| 6,135,067 A * | 10/2000 | Klamm | ................ | F01P 11/0285 123/41.01 |
| 2015/0114350 A1* | 4/2015 | Pursifull | .......... | F02M 35/10019 123/445 |

* cited by examiner

Primary Examiner — Peter J Bertheaud
Assistant Examiner — Dnyanesh G Kasture
(74) Attorney, Agent, or Firm — FisherBroyles, LLP; Susan M. Oiler

(57) ABSTRACT

An evacuator for supplying vacuum to a device in a boosted engine air system is disclosed. The evacuator defines a body comprising a converging motive section, a diverging discharge section, at least one suction port, and a Venturi gap located between an outlet end of the converging motive section and an inlet end of the diverging discharge section. A lineal distance is measured between the outlet end and the inlet end. The lineal distance is decreased in length if higher suction vacuum at a specific set of operating conditions is required and the lineal distances is increased in length if higher suction flow rate at the specific set of operating conditions is required.

16 Claims, 14 Drawing Sheets

Related U.S. Application Data

62/042,645, filed on Aug. 27, 2014, provisional application No. 62/059,371, filed on Oct. 3, 2014.

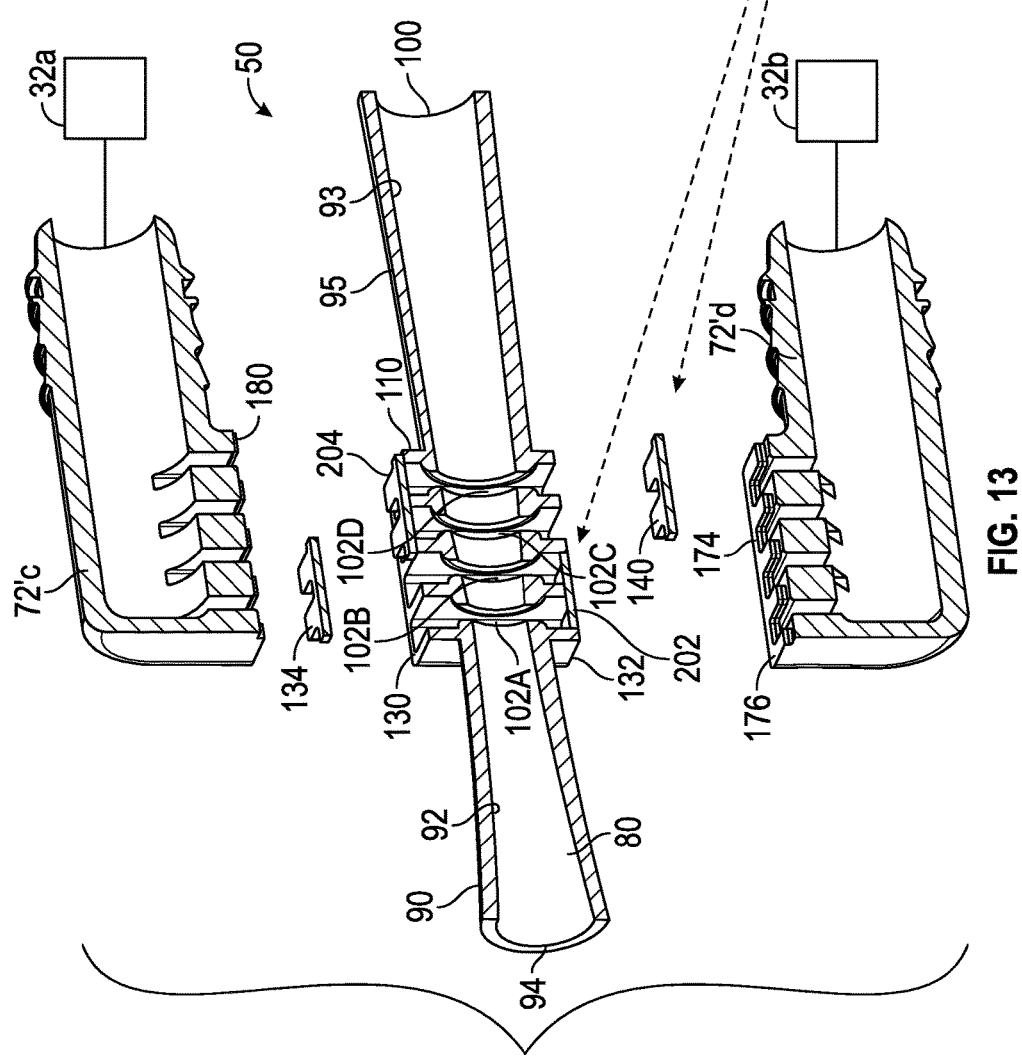

LOW-COST EVACUATOR FOR AN ENGINE HAVING TUNED VENTURI GAPS

RELATED APPLICATIONS

This application is a continuation application of U.S. application Ser. No. 14/830,864, filed Aug. 20, 2015, which claims the benefit of U.S. Provisional Application No. 62/042,568, filed on Aug. 27, 2014, U.S. Provisional Application No. 62/042,569 filed on Aug. 27, 2014, U.S. Provisional Application No. 62/042,645 filed on Aug. 27, 2014, and U.S. Provisional Application No. 62/059,371 filed on Oct. 3, 2014.

TECHNICAL FIELD

This application relates to an evacuator, and in particular to a low-cost evacuator including at least one tuned Venturi gap.

BACKGROUND

In some vehicles vacuum is used to operate or assist in the operation of various devices. For example, vacuum may be used to assist a driver applying vehicle brakes, turbocharger operation, fuel vapor purging, heating and ventilation system actuation, and driveline component actuation. If the vehicle does not produce vacuum naturally, such as from the intake manifold, then a separate vacuum source is required to operate such devices. For example, in some boosted engines where intake manifold pressures are often at pressures greater than atmospheric pressure, intake manifold vacuum may be replaced or augmented with vacuum from an evacuator.

As used herein, an evacuator is defined as a converging, diverging nozzle assembly with three connections, a motive port connected to the intake air at atmospheric pressure, a discharge port connected to the manifold vacuum located downstream of the throttle, and a suction port connected to a device requiring vacuum. A low pressure region may be created within the evacuator so that air can be drawn from a vacuum reservoir or may directly act on a device requiring vacuum, thereby reducing pressure within the vacuum reservoir or device requiring vacuum. In general, there is a continuing need in the art for improved evacuators that generate increased vacuum pressure and increased suction mass flow rate while decreasing the consumption of engine air.

A control valve may be used to shut off or stop compressed air from flowing through the evacuator if the engine is operating under boosted pressures. Specifically, the control valve is used to prevent compressed air located at the intake manifold from flowing through the evacuator, and back into the intake air, which is at atmospheric pressure. However, several drawbacks exist when using this approach. For example, the evacuator may only be able to provide vacuum if the engine is not operating under boosted pressures, since the control valve shuts off the flow of compressed air when the engine operates under boosted pressures. Moreover, the control valve is typically an expensive component that adds significantly to the overall cost of the system. Thus, there is a continuing need in the art for an improved, cost-effective evacuator for use in a boosted engine that may eliminate the need for a control valve.

Finally, it should also be appreciated that the evacuator may be defined by a housing assembly. The housing assembly includes a body and one or more suction caps. The suction caps are used to connect the body of the housing to a vacuum canister. Sometimes a check valve may be positioned within the housing of the ejector or the aspirator, between the body and the suction cap. The check valve may ensure that air does not pass from the evacuator, which may be an aspirator or an evacuator, to the vacuum canister.

The body and the suction caps may be welded or otherwise joined to one another to create the housing assembly. However, in order to assure that the housing assembly is substantially fluid-tight and does not allow for air to enter the interior of the housing, the weld joint between the body and the suction cap should not only be mechanically rigid, but also provide a fluid-tight seal. In other words, the weld between the body and the suction cap needs to provide a pneumatic seal to substantially prevent the ingression of air or other fluids into the housing assembly. This requirement may be challenging to meet, and requires relatively stringent inspection requirements which may add to the overall assembly and manufacturing cost of the part. Thus, there is a continuing need in the art for cost-effective ejectors and aspirators that still meet air leakage requirements.

SUMMARY

In one embodiment, an evacuator for supplying vacuum to a device in a boosted engine air system is disclosed. The evacuator defines a body comprising a converging motive section, a diverging discharge section, at least one suction port; and a Venturi gap located between an outlet end of the converging motive section and an inlet end of the diverging discharge section. A lineal distance is measured between the outlet end and the inlet end. The lineal distance is decreased in length if higher suction vacuum at a specific set of operating conditions is required and the lineal distances is increased in length if higher suction flow rate at the specific set of operating conditions is required.

In another embodiment, an evacuator for providing vacuum is disclosed, and includes a housing, a first suction port, and a second suction port. The housing defines a first Venturi gap separated from a second Venturi gap by a lineal distance and a converging motive section separated from a diverging discharge section by the housing. The converging motive section and the diverging discharge section are in fluid communication with one another through the first and second Venturi gaps. The first suction port is in fluid communication with the first Venturi gap. The second suction port is in fluid communication with the second Venturi gap. The first Venturi gap is shaped to generate a higher suction vacuum than the second Venturi gap, and the second Venturi gap is shaped to generate a higher suction flow rate than the first Venturi gap.

In yet another embodiment, a pneumatically actuated vacuum pump is disclosed, and includes a body, at least one suction port, and at least one check valve. The body defines a converging motive section, a diverging discharge section, at least one body suction port, at least one mating section, and a Venturi gap located between an outlet end of the converging motive section and an inlet end of the diverging discharge section. The suction port is fluidly connecting the at least one body suction port with a vacuum consuming device. The suction port includes a recess sized and shaped to receive the mating section of the body. The check valve is fluidly connected to the Venturi gap and the at least one suction port. The check valve is compressed between the recess of the at least one suction port and the mating section of the body such that the outer periphery of the at least one check valve creates a substantially fluid-tight seal between the body and the at least one suction port.

BRIEF DESCRIPTION OF THE DRAWINGS

FIG. 13 is an exploded, longitudinal cross-sectional view of one embodiment of an evacuator.

FIG. 14 is an illustration of an alternative embodiment of a check valve element shown in FIG. 13.

DETAILED DESCRIPTION

Figure 1:
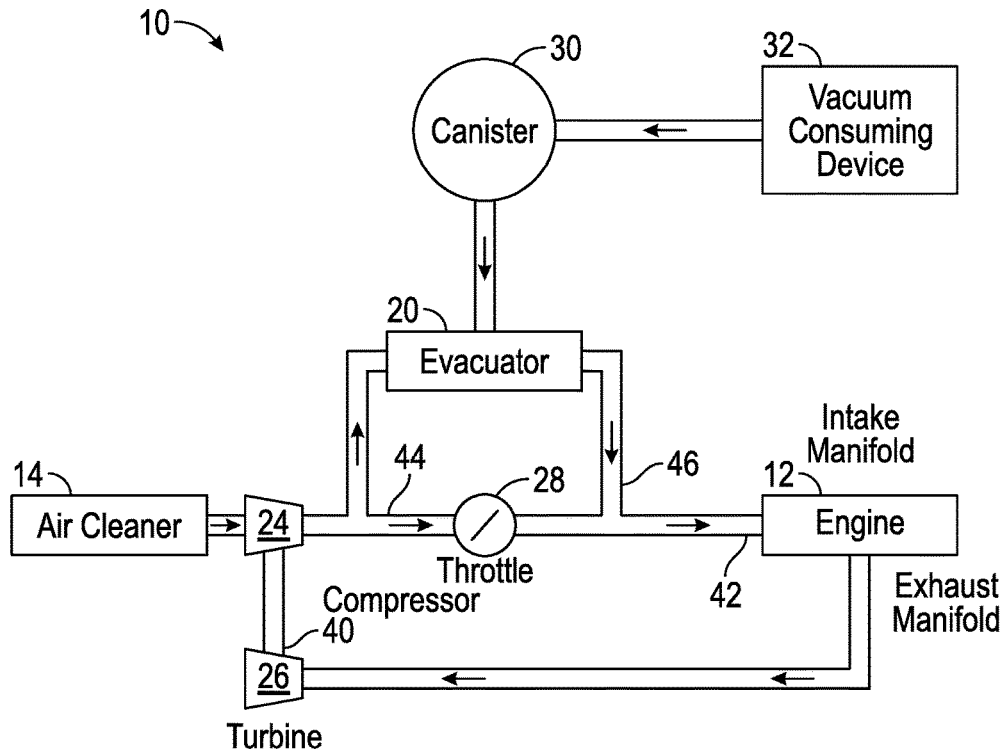
FIG. 1 is a schematic diagram including flow paths and flow directions of one embodiment of an internal combustion engine turbo system including an evacuator.

The following detailed description will illustrate the general principles of the invention, examples of which are additionally illustrated in the accompanying drawings. In the drawings, like reference numbers indicate identical or functionally similar elements. As used herein, the term fluid may include any liquid, suspension, colloid, gas, plasma, or combinations thereof.

Referring now to FIG. 1, an exemplary turbocharged engine air system 10 for providing vacuum to a vehicle vacuum system is disclosed. The engine air system 10 may include an internal combustion engine 12, an air cleaner 14, an evacuator 20, a compressor 24, a turbine 26, a throttle 28, a vacuum reservoir or canister 30, and a vacuum consuming device 32. The internal combustion engine 12 may be, for example, a spark ignited (SI) engine, a compression ignition (CI) engine, or a natural gas engine. In one embodiment, the internal combustion engine 12 may be included in an electric motor/battery system that is part of a hybrid vehicle. In the embodiment as shown in FIG. 1, the internal combustion engine 12 is boosted. This means that the compressor 24 and turbine 26 may be part of a turbocharger for improving the power output and overall efficiency of the internal combustion engine 12. The turbine 26 may include a turbine wheel (not illustrated in FIG. 1) that harnesses and converts exhaust energy into mechanical work through a common shaft 40 to turn a compressor wheel (not illustrated in FIG. 1) of the compressor 24. The compressor wheel ingests, compresses, and feeds air at elevated operating pressures into the intake manifold 42 of the internal combustion engine 12.

The vacuum canister 30 may be supplied vacuum from the evacuator 20. The evacuator 20 is supplied air from the compressor 24. Specifically, clean air at atmospheric pressure exits the air cleaner 14 and may be compressed by the compressor 24 before passing through the evacuator 20. As explained in greater detail below, the evacuator 20 may be used to supply vacuum to the vacuum canister 30. In particular, the amount of vacuum supplied by the evacuator 20 may be adjusted based on the specific operating conditions of the engine air system 10, which is explained in greater detail below.

The throttle 28 may be located downstream of the air cleaner 14 and the compressor 24, and upstream of an intake manifold 42 of the internal combustion engine 12. The throttle 28 may be opened as an operator depresses upon an accelerator pedal (not shown). When the throttle 28 is opened, compressed air from the compressor 24 is free to fill the intake manifold 42 of the internal combustion engine 12, thereby increasing the pressure at the intake manifold 42. Those skilled in the art will appreciate that the throttle 28 may be positioned in a plurality of partially opened positions based on the amount of depression of the accelerator (not shown). Since the engine air system 10 is turbocharged, the pressure at the intake manifold 42 may increase to a pressure that is above atmosphere as the throttle 28 is opened.

Figure 2:
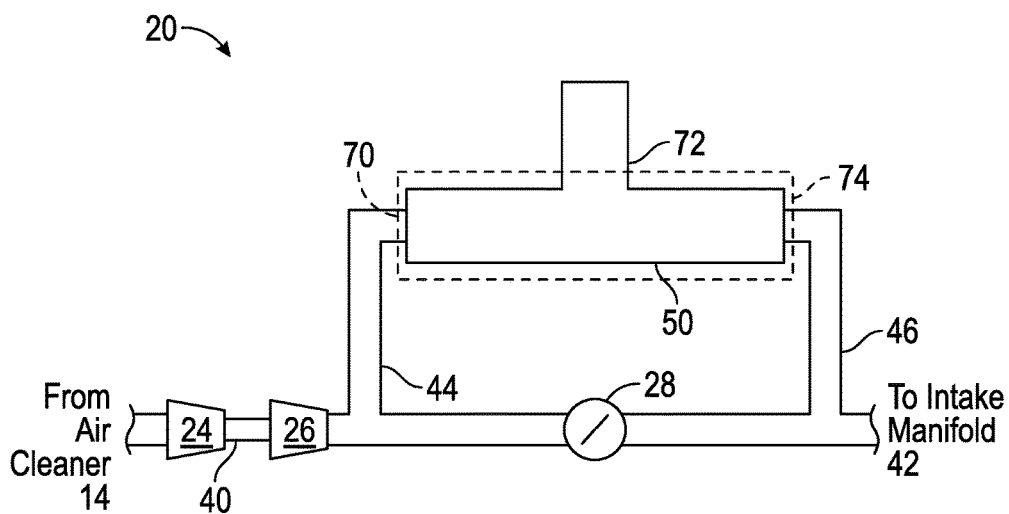
FIG. 2 is schematic diagram of the evacuator shown in FIG. 1.

The evacuator 20 may include a first engine air connection 44, a second engine air connection 46, and a pneumatically actuated vacuum pump 50 that is shown in FIG. 2. The first engine air connection 44 of the evacuator 20 may be fluidly connected to the engine air system 10 at a location upstream of the throttle 28 and downstream of the compressor 24. The second engine air connection 46 of the evacuator 20 may be fluidly connected to the engine air system 10 at a location upstream of the intake manifold 42 and downstream of the throttle 28. The pneumatically actuated vacuum pump 50 (FIG. 2) may be used to supply vacuum to the vacuum canister 30. Specifically, the amount of vacuum supplied by the pneumatically actuated vacuum pump 50 may be adjusted based on the specific operating conditions of the engine air system 10, and is explained in greater detail below. Although the evacuator 20 is illustrated as supplying vacuum to the vacuum canister 30, those skilled in the art will appreciate that in an alternative embodiment, the evacuator 20 may directly supply vacuum to the vacuum consuming device 32.

The vacuum consuming device 32 may be a device requiring vacuum, such as a brake booster. In an embodiment, the vacuum consuming device 32 may also include additional vacuum consumers as well such as, for example, turbocharger waste gate actuators, heating and ventilation actuators, driveline actuators (e.g., four wheel drive actuators), fuel vapor purging systems, engine crankcase ventilation, and fuel system leak testing systems.

FIG. 2 is a schematic diagram of one embodiment of the evacuator 20 shown in FIG. 1, and illustrates the pneumatically actuated vacuum pump 50. The pneumatically actuated vacuum pump 50 may act as either an aspirator or an ejector depending on the pressure at the intake manifold 42 (FIG. 1). Specifically, an aspirator is an evacuator with its motive fixed at atmospheric pressure and its discharge at below atmospheric pressure. An ejector is an evacuator with its motive pressure at above atmospheric pressure, and its discharge fixed at atmospheric pressure.

Referring to FIGS. 1-2, as used herein, the pneumatically actuated vacuum pump 50 may be a converging, diverging nozzle assembly with three or more connections. The pneumatically actuated vacuum pump 50 may include a motive port 70 fluidly connected to the first engine air connection 44, a discharge port 74 fluidly connected to the second engine air connection 46, and one or more suction ports 72 fluidly connected to the vacuum canister 30. Specifically, the motive port 70 of the aspirator 50 may be fluidly connected to the engine air system 10 downstream of the compressor 24, and the discharge port 74 of the aspirator 50 may be fluidly connected to the engine air system 10 upstream of the intake manifold 42. Those skilled in the art will readily appreciate that since the evacuator 20 is connected to the engine air system 10 downstream of the compressor 24, this usually eliminates the need for a check valve between the compressor 24 and the motive port 70 of the pneumatically actuated vacuum pump 50. This is because the pressure at the engine air connection 44, which is upstream of the throttle 28, should always be greater than the pressure at the engine air connection 46, which is downstream of the throttle 28.

Figure 3:
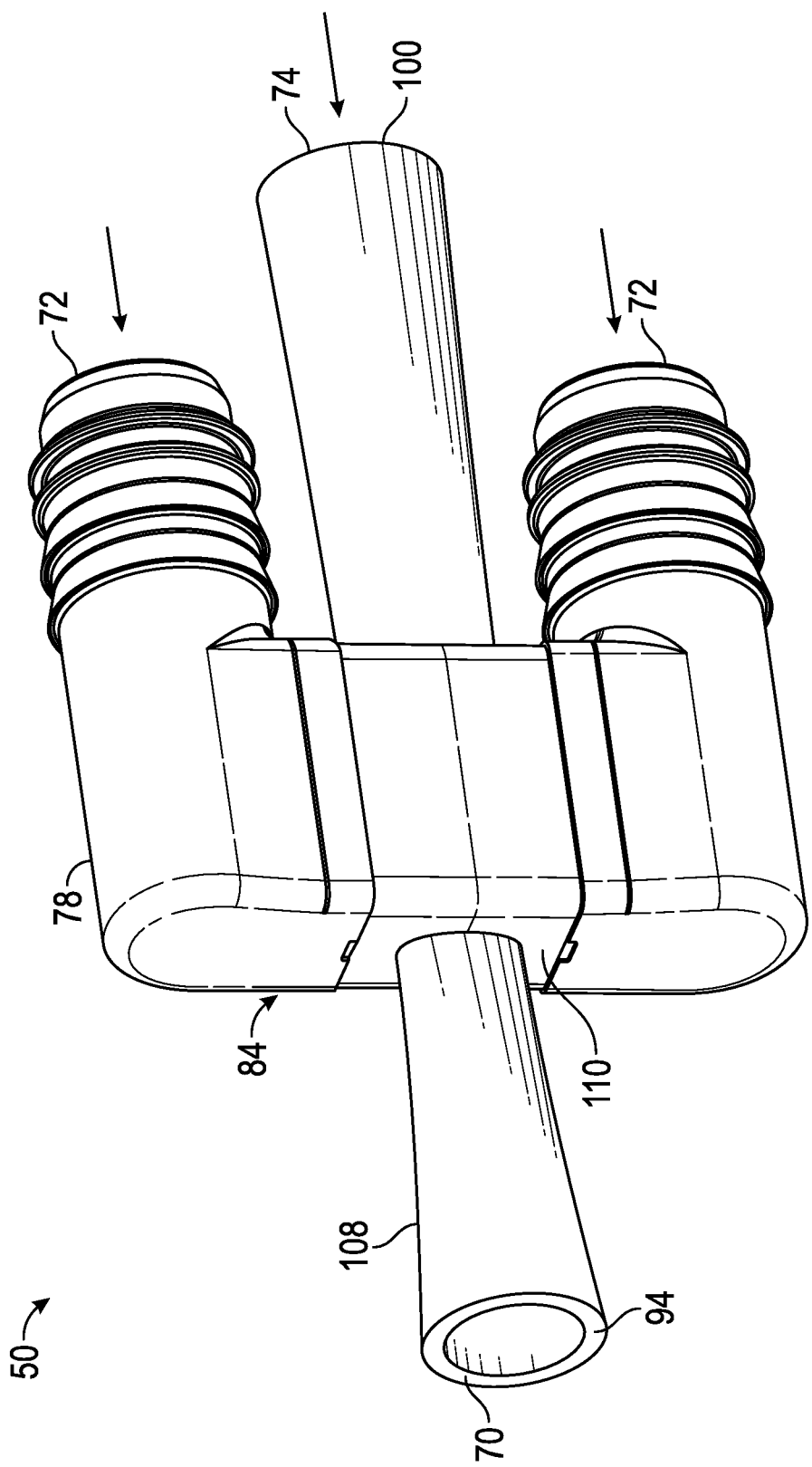
FIG. 3 is a perspective view of the evacuator in FIG. 2.
Figure 4:
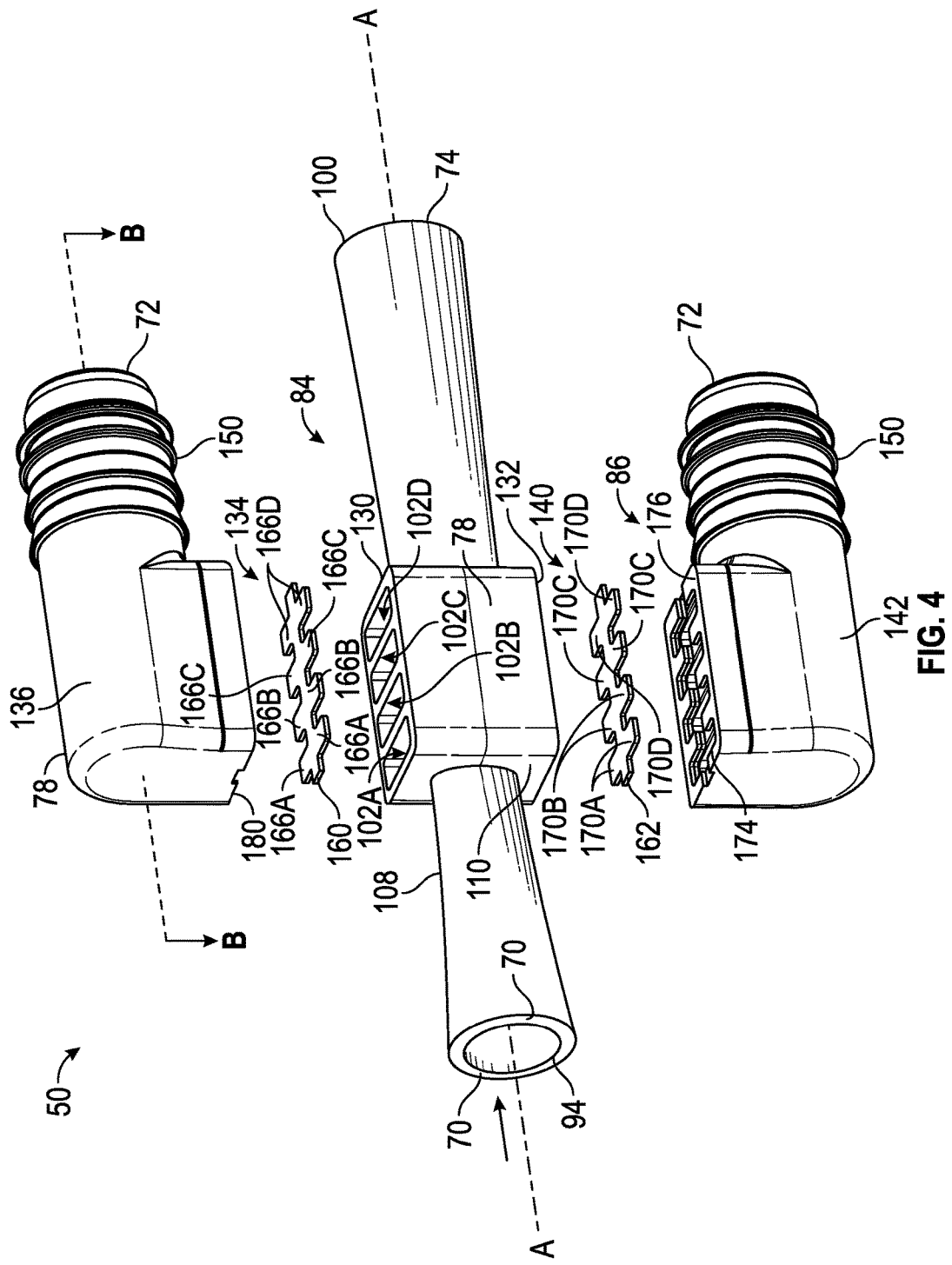
FIG. 4 is an exploded view of the evacuator shown in FIG. 3.
Figure 5:
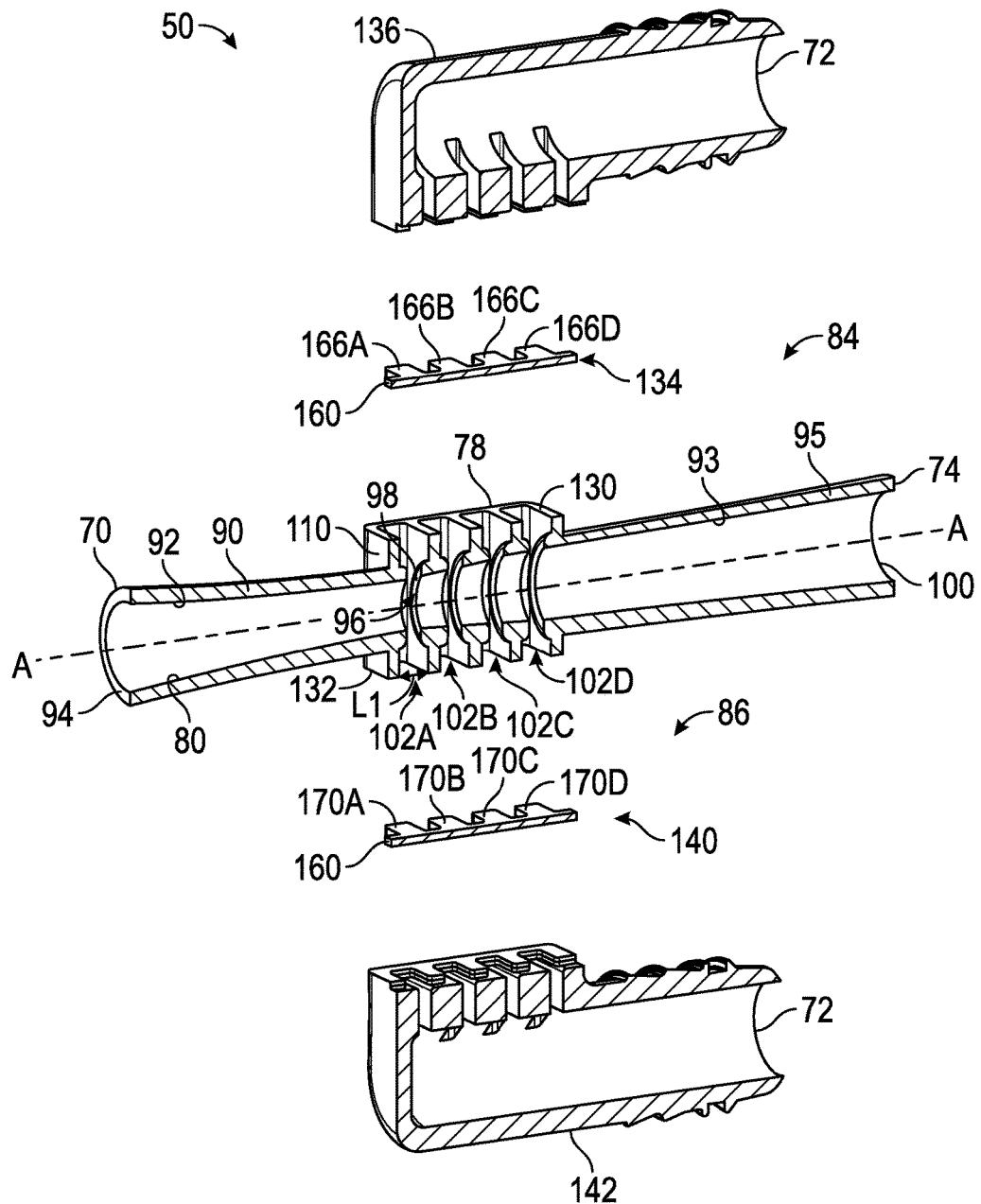
FIG. 5 is an exploded view of the evacuator shown in FIG. 2, taken along section line B-B in FIG. 4.

FIG. 3 is a perspective view of the pneumatically actuated vacuum pump 50, FIG. 4 is an exploded view of the pneumatically actuated vacuum pump 50 shown in FIG. 3, and FIG. 5 is a sectioned view of the exploded pneumatically actuated vacuum pump 50 shown in FIG. 4. Referring generally to FIGS. 3, 4, and 5, a body 78 of the pneumatically actuated vacuum pump 50 may define a passageway 80 (shown in FIG. 5) that extends along a longitudinal axis A-A. In the embodiment as illustrated in FIGS. 3-5, the body 78 of the pneumatically actuated vacuum pump 50 includes four ports that are connectable to subsystems of the internal combustion engine 12 (FIG. 1). Specifically, the pneumatically actuated vacuum pump 50 may include the motive port 70, the discharge port 74, and two suction ports 72. In the non-limiting embodiment as shown, the pneumatically actuated vacuum pump 50 includes two suction ports 72, where one of the suction ports 72 is located along a top portion 84 of the pneumatically actuated vacuum pump 50 and the remaining suction port 72 is located along a bottom portion 86 of the pneumatically actuated vacuum pump 50. However, it is to be understood that in another embodiment only one suction port 72 located along either the top portion 84 or the bottom portion 86 of the pneumatically actuated vacuum pump 50 may be used as well.

Referring to FIG. 5, the passageway 80 of the pneumatically actuated vacuum pump 50 may include a first tapering portion 92 (also referred to as a motive cone) in a motive section 90 of the passageway 80. The passageway 80 may also include a second tapering portion 93 (also referred to as a discharge cone) in a discharge section 95 of the passageway 80. The first tapering portion 92 of the passageway 80 may include an inlet end 94 and an outlet end 96. Similarly, the second tapering portion 93 of the passageway 80 may also include an inlet end 98 and an outlet end 100.

Figure 6:
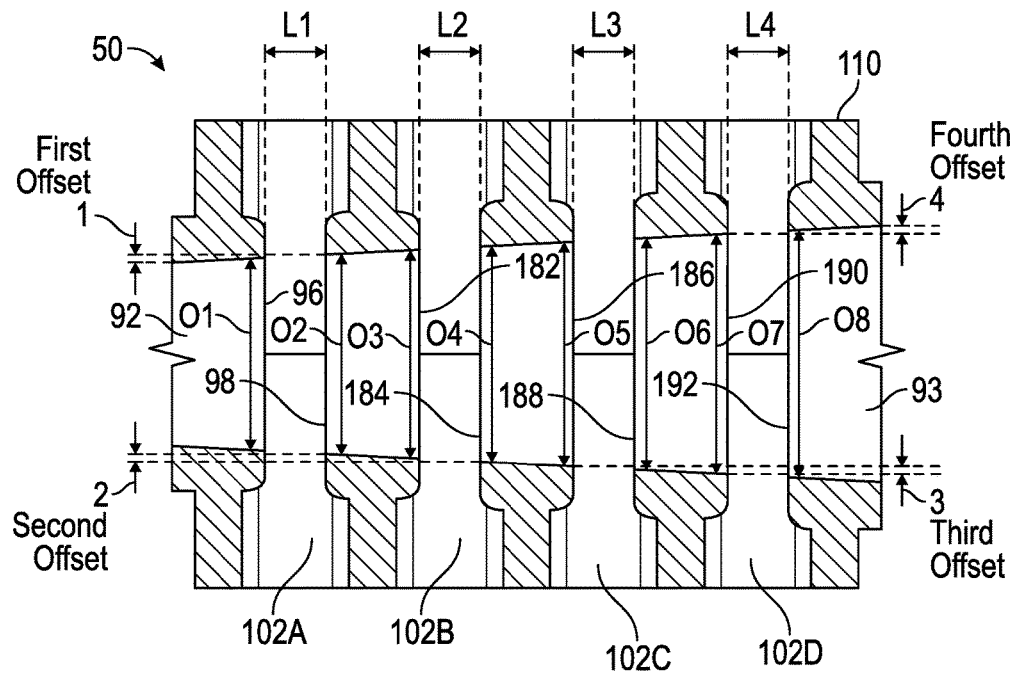
FIG. 6 is an enlarged view of a portion of the evacuator shown in FIG. 3, taken along section line B-B in FIG. 4.

As seen in FIG. 5, the first tapering portion 92 of the pneumatically actuated vacuum pump 50 may be fluidly coupled to the second tapering portion 93 by a Venturi gap 102A. The Venturi gap 102A may be a fluid junction that places the suction ports 72 in fluid communication with the motive section 90 and the discharge section 95 of the pneumatically actuated vacuum pump 50. As best seen in FIG. 6, the Venturi gap 102A may be the lineal distance L1 measured between the outlet end 96 of the first tapering portion 92 and the inlet end 98 of the second tapering portion 93. The outlet end 96 of the first tapering portion 92 of the pneumatically actuated vacuum pump 50 represents the inlet of the Venturi gap 102A. Similarly, the inlet end 98 of the second tapering portion 93 of the pneumatically actuated vacuum pump 50 represents the outlet of the Venturi gap 102A.

Turning back to FIG. 5, the inlet ends 94, 98 and the outlet ends 96, 100 of the passageway 80 of the pneumatically actuated vacuum pump 50 may include any type of profile, such as, but not limited to, a circular shape, an ellipse shape, or another polygonal form. Moreover, the gradually, continuously tapering inner diameter extending from inlet ends 94, 98 and the outlet ends 96, 100 of the passageway 80 may define a hyperboloid or a cone. Some exemplary configurations for the outlet end 96 of the first tapering portion 92 and the inlet end 98 of the second tapering portion 93 are presented in FIGS. 4-6 of co-pending U.S. patent application Ser. No. 14/294,727, filed on Jun. 3, 2014, which is incorporated by reference herein in its entirety.

A plurality of additional gaps 102B, 102C, 102D may be located downstream of the Venturi gap 102A, along the second tapering portion 93 of the pneumatically actuated vacuum pump 50. In the embodiments as shown in the figures, the pneumatically actuated vacuum pump 50 includes a total of four gaps, where three gaps 102B, 102C, 102D are located downstream of the Venturi gap 102A. It is to be understood that this illustration is merely one exemplary embodiment of the pneumatically actuated vacuum pump 50. Those skilled in the art will readily appreciate that any number of gaps may be located downstream of the Venturi gap 102A. Some configurations of the multiple gaps are presented in FIGS. 2-5C of U.S. patent application Ser. No. 14/452,651 filed on Aug. 6, 2014, which is incorporated by reference herein in its entirety. Moreover, although the figures illustrate the pneumatically actuated vacuum pump 50 including a plurality of gaps 102B, 102C, 102D located downstream of the Venturi gap 102A, it is to be understood that in one embodiment, the pneumatically actuated vacuum pump 50 may only include the Venturi gap 102A. That is, there are no additional gaps located downstream of the Venturi gap 102A.

Referring to both FIGS. 4 and 5, the body 78 of the pneumatically actuated vacuum pump 50 may define a housing 110. The housing 110 may surround a portion of the second tapering portion 93 of the pneumatically actuated vacuum pump 50, and contains the gaps 102A, 102B, 102C, 102D therein. In the embodiment as illustrated, the housing 110 may include a generally rectangular profile, however the housing 110 is not limited to a rectangular profile.

Each gap 102A, 102B, 102C, 102D may be a void located within the housing 110. Specifically, gaps 102A, 102B, 102C, 102D may each be similar to an interior cross-section of the housing 110. For example, as seen in FIG. 5, the gap 102A may include a generally rectangular profile that substantially corresponds with the interior cross-section of the housing 110. The flow of motive air through the first tapering portion 92 of the pneumatically actuated vacuum pump 50 may increase in speed, but creates low static pressure. This low static pressure draws air from the suction ports 72 into the Venturi gap 102A. The remaining gaps 102B, 102C, 102D located downstream of the Venturi gap 102A may also be used to further draw in air from the suction ports 72 as well.

Continuing to refer to FIGS. 4-5, the housing 110 may include a top surface 130 and a bottom surface 132. An upper check valve element 134 and an upper suction piece 136 may be positioned against the top surface 130, and a lower check valve element 140 and a lower suction piece 142 may be positioned against the bottom surface 132 when the pneumatically actuated vacuum pump 50 is assembled (shown in FIG. 3). Although both the upper check valve element 134 and the lower check valve element 140 are illustrated, it is to be understood in another embodiment the housing 110 may only include either the upper check valve element 134 or the lower check valve element 140. Specifically, the upper check valve element 134 may be positioned between the upper suction piece 136 and the top surface 130 of the housing 110, and the lower check valve element 140 may be positioned between the lower suction piece 142 and the bottom surface 132 of the housing 110. In one embodiment, the upper suction piece 136 and the lower suction piece 142 may each include barbs 150 for mating with a hose (not illustrated) that connects the suction ports 72 to the vacuum canister 30 (FIG. 1).

The upper check valve element 134 and the lower check valve element 140 may be constructed of a relatively flexible material such as, for example, an elastomer. The flexible material enables the upper check valve element 134 and the lower check valve element 140 to bend or deform during operation of the pneumatically actuated vacuum pump 50. Turning now to FIG. 4, the upper check valve element 134 may include a first section 160 and the lower check valve element 140 may include a first section 162. The first sections 160, 162 of the upper check valve element 134 and the lower check valve element 140 are each substantially parallel with the axis A-A of the pneumatically actuated vacuum pump 50. A plurality of outwardly projecting fingers or tabs 166A, 166B, 166C, 166D may extend outwardly and in a direction generally transverse with respect to the first section 160 of the upper check valve element 134. Similarly, a plurality of outwardly projecting fingers or tabs 170A, 170B, 170C, 170D extend in a direction generally transverse with respect to the first section 162 of the lower check valve element 140.

Each of the tabs 166A, 166B, 166C, 166D of the upper check valve element 134 may correspond to and is fluidly connected to one of the gaps 102A, 102B, 102C, 102D. Similarly, each of the tabs 170A, 170B, 170C, 170D of the lower check valve element 140 may also correspond to and is fluidly connected to one of the gaps 102A, 102B, 102C, 102D. As seen in FIG. 4, a recess 174 may be located along an upper surface 176 the lower suction cap 142. The recess 174 may include a profile that generally corresponds with the lower check valve element 140. Thus, the lower check valve element 140 may be seated within the recess 174 of the lower suction cap 142. It is understood that a similar recess (which is not visible in the figures) may also be located along a lower surface 180 of the upper suction cap 146 as well, and includes a profile that generally corresponds with the upper check valve element 134.

Referring specifically to FIG. 4, when pressure located in the upper suction port 72 of the pneumatically actuated vacuum pump 50 is equal to or less than pressure in the gaps 102A, 102B, 102D 102D the upper check valve element 134 may be seated flush within the upper suction cap 136, and the tabs 166A, 166B, 166C, 166D are not bent. Similarly, when pressure located in the lower suction port 72 of the pneumatically actuated vacuum pump 50 is equal to or less than pressure in the gaps 102A, 102B, 102C, 102D the lower check valve element 140 may be seated flush within the lower suction cap 142, and the tabs 170A, 170B, 170C, 170D are not bent. When the check valves 134, 140 are in the closed position, air from the upper and lower suction ports 72 of the pneumatically actuated vacuum pump 50 may not move into the gaps 10A, 102B, 102C, 102D.

When the pressure located in the upper suction port 72 of the pneumatically actuated vacuum pump 50 is greater than the pressure in the gaps 102A, 102B, 102C, 102D the upper check valve element 134 may open. Specifically, the upper check valve 134 is flexible enough such that the tabs 166A, 166B, 166C, 166D may bend inwardly along the first portion 160 and towards the gaps 102A, 102B, 102C, 102D, thereby allowing air from the upper suction port 72 to be suctioned into the gaps 102A, 102B, 102C, 102D. Similarly, when the pressure located in the lower suction port 72 of the pneumatically actuated vacuum pump 50 is greater than the pressure in the gaps 102A, 102B, 102C, 102D the lower check valve element 140 may open. Specifically, the lower check valve 140 is flexible enough such that the tabs 170A, 170B, 170C, 170D may bend inwardly along the first portion 162 and towards the gaps 102A, 102B, 102C, 102D thereby allowing air from the lower suction port 72 to be suctioned into the gaps 102A, 102B, 102C, 102D.

Those skilled in the art will readily appreciate that each of the tabs 166A, 166B, 166C, 166D of the upper check valve element 134 may bend independently of one another. Similarly, each of the tabs 170A, 170B, 170C, 170D of the lower check valve element 140 may also bend independently of one another. Thus, during some operating conditions of the pneumatically actuated vacuum pump 50, only a portion of the gaps 102A, 102B, 102C, 102D may have their corresponding check valves open in order to allow air to be sucked out of the vacuum canister 30 (FIG. 1), while the remaining gaps 102A, 102B, 102C, 102D may have their corresponding check valves closed. A detailed explanation of the operation of the check valves are presented in FIGS. 5B-11 and 13-21 of U.S. patent application Ser. No. 14/452,651 filed on Aug. 6, 2014. As mentioned above, this application is incorporated by reference herein in its entirety.

FIG. 6 is an enlarged, cross sectioned view of the gaps 102A, 102B, 102C, 102D located within the housing 110 of the pneumatically actuated vacuum pump 50. As mentioned above, the Venturi gap 102A may be defined as the lineal distance L1 measured between the outlet end 96 of the first tapering portion 92 (seen in FIG. 5) and the inlet end 98 of the second tapering portion 93 (seen in FIG. 5). The remaining gaps 102B, 102C, 102D also include respective lineal distances L2, L3, L4. These lineal distances are each measured from a respective inlet wall and an outlet wall of each gap. Specifically, gap 102B is measured between an inlet surface 182 and an outlet surface 184, gap 102C is measured between an inlet surface 186 and an outlet surface 188, and gap 102D is measured between an inlet surface 190 and an outlet surface 192. The inlet surfaces 182, 186, and 190 and the outlet surfaces 184, 188, and 192 are all defined by the housing 110 of the pneumatically actuated vacuum pump 50.

Figure 7:
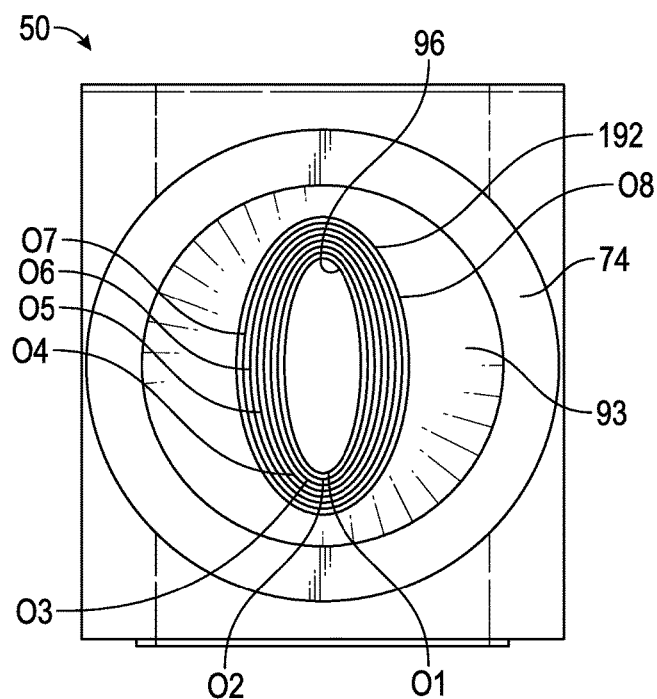
FIG. 7 is an illustration of the evacuator when viewed from a discharge port.

FIG. 7 is an illustration of the pneumatically actuated vacuum pump 50 when viewed from the discharge port 74. Referring to FIGS. 6, and 7, the diverging profile of the second tapering portion 93 of the pneumatically actuated vacuum pump 50 creates an offset or difference in the inlet and outlet openings of each gap 102A, 102B, 102C, and 102D. As seen in FIG. 7, the inlet and outlet openings of the gaps 102A, 102B, 102C, 102D each include a substantially elliptical profile. However, as explained above, in another embodiment the inlet and outlet openings may include another type of profile instead. The outlet end 96 of the first tapering portion 92 (which represents the inlet of the Venturi gap 102A) includes an opening O1, and the inlet end 98 of the second tapering portion 93 (which represents the outlet of the Venturi gap 102A) includes an opening O2. The profile of the opening O2 of the outlet is sized to be greater than the opening O1 of the inlet of the Venturi gap 102A. In other words, there is an offset between the inlet and the outlet openings of the Venturi gap 102A. A first offset 1 represents the difference between the inlet and outlet openings of the Venturi gap 102A. In one non-limiting embodiment, the first offset 1 may be about 0.25 millimeters.

Continuing to refer to both FIGS. 6 and 7, an opening O3 is associated with the inlet surface 182 of the gap 102B, and an opening O4 is associated with the outlet surface 184 of the second gap 102B. Similar to the Venturi gap 102A, the opening O4 of the outlet surface 184 is greater than the opening O3 of the inlet surface 182. A second offset 2 represents the difference between the inlet surface 182 and the outlet surface 184 of the second gap 102B. Similarly, an opening O5 is associated with the inlet surface 186 of the gap 102C, and an opening O6 is associated with the outlet 188 of the gap 102C. A third offset 3 represents the difference between the inlet surface 186 and the outlet surface 188 of the gap 102C. Finally, an opening O7 is associated with the inlet surface 190 of the gap 102D, and an opening O8 is associated with the outlet 192 of the gap 102D. A fourth offset 4 represents the difference between the inlet surface 190 and the outlet surface 192 of the gap 102D.

Referring generally to FIGS. 5 and 6, during operation an area of minimum pressure may be created within the housing 110 of the pneumatically actuated vacuum pump 50. In particular, the area of minimum pressure may be located adjacent or within one or more of the gaps 102A, 102B, 102C, 102D of the pneumatically actuated vacuum pump 50. The area of minimum pressure also represents an area of maximum velocity within the pneumatically actuated vacuum pump 50. Those skilled in the art will readily appreciate that if the pneumatically actuated vacuum pump 50 is operating as an ejector, then as the motive pressure of the pneumatically actuated vacuum pump 50 increases the location of the minimum pressure within the pneumatically actuated vacuum pump 50 may shift or move downstream within the second tapering portion 73. As the location of minimum pressure within the pneumatically actuated vacuum pump 50 shifts downstream of the Venturi gap 102A, the gaps 102B, 102C, 102D may be used to further suction air out of the vacuum canister 30. Those skilled in the art will also readily understand that if the pneumatically actuated vacuum pump 50 is operating as an aspirator, then as the pressure at the discharge port 74 decreases the location of the minimum pressure may also shift or move downstream as well.

Continuing to refer to FIG. 6, the lineal distances L1, L2, L3, L4 of each of the gaps 102A, 102B, 102C, 102D located within the housing 110 of the pneumatically actuated vacuum pump 50 may be adjusted or tuned in order to accommodate the location of the minimum pressure within the pneumatically actuated vacuum pump 50. Specifically, one of the lineal distances L1, L2, L3, L4 of one of the gaps 102A, 102B, 102C, 102D located within the housing 110 of the pneumatically actuated vacuum pump 50 may be designed to be narrower or decreased in length if a higher suction vacuum (i.e., lower suction pressures) at a specific set of operating conditions is desired. In addition to decreasing the length of one of the gaps 102A, 102B, 102C, 102D, the offset distances (i.e., the first offset 1, the second offset 2, the third offset 3, or the fourth offset 4) may be decreased as well in order to produce a higher suction vacuum (i.e., lower suction pressures) at a specific set of operating conditions. In other words, if a specific one of the gaps decreases in length, then the difference between the respective inlet and outlet opening of the specific gap should also decrease as well. Similarly, one of the lineal distances L1, L2, L3, L4 of one of the gaps 102A, 102B, 102C, 102D located within the housing 110 of the pneumatically actuated vacuum pump 50 may be designed to be wider or increased in length if a higher suction flow rate at a specific set of operating conditions is desired. In addition to increasing the length of one of the gaps 102A, 102B, 102C, 102D, the offset distance associated with one of the gaps (i.e., the first offset 1, the second offset 2, the third offset 3, or the fourth offset 4) should be increased as well in order to produce a higher suction flow rate at a specific set of operating conditions. In other words, if a specific one of the gaps increases in length, then the difference between the respective inlet and outlet openings of the specific gap should also increase as well.

A specific set of operating conditions may be defined by the pressures at both the motive port 70 as well as the discharge port 74 of the pneumatically actuated vacuum pump 50. For example, during one set of operating conditions the motive port 70 is at atmospheric pressure and if the discharge port 74 is at about eighty percent of atmospheric pressure. During this set of operating conditions, the pneumatically actuated vacuum pump 50 is operating as an aspirator. In this example, the location of the minimum pressure within the pneumatically actuated vacuum pump 50 may be assumed or determined to be at the gap 102A. If the engine 12 (seen in FIG. 1) operates to produce these exemplary conditions for a significant amount of time, then a designer or engineer may determine it generally advantageous to adjust the lineal distance L1 of the gap 102A accordingly (i.e., the lineal distance L1 of the gap 102A should be widened or narrowed depending on requirements). In addition to adjusting the lineal distance L1, it is to be understood that the first offset 1 may also be adjusted accordingly as well. For example, if the lineal distance L1 of the gap 102A is increased, then the first offset 1 may increase as well. Similarly, if the lineal distance L1 of the gap 102A is decreased, then the first offset 1 may decrease as well.

In another illustrative example, if the pressure of the motive port 70 is higher than atmospheric pressure (e.g., at about 168 kilopascals) and if the discharge port 74 is also higher than atmospheric pressure but less than the motive port 70 (e.g., at about 135 kilopascals), then the pneumatically actuated vacuum pump 50 is operating as an ejector. In this example, the location of the minimum pressure within the pneumatically actuated vacuum pump 50 is assumed or determined to be at the gap 102C. If the engine 12 (seen in FIG. 1) operates to produce these exemplary conditions for a significant amount of time, then a designer or engineer may determine it generally advantageous to adjust the lineal distance L3 of the gap 102C accordingly (i.e., either the gap 102C should be widened or narrowed). In addition to adjusting the lineal distance L3 of the gap 102C, it is to be understood that the third offset 3 may also be adjusted accordingly as well. For example, if the lineal distance L3 of the gap 102C is increased, then the third offset 3 may increase as well. Similarly, if the lineal distance L3 of the gap 102C is decreased, then the third offset 3 may decrease as well.

It is to be understood in one embodiment, more than one of the gaps 102A, 102B, 102C, 102D may be adjusted or tuned as well. For example, in one embodiment, one of the gaps 102A, 102B, 102C, 102D may be increased in length to provide a higher suction flow rate at a first set of operating conditions, and the remaining gaps 102A, 102B, 102C, 102D may be decreased in length to provide a higher suction vacuum at another set of operating conditions. Finally, those skilled in the art will readily appreciate that in an alternative embodiment where there are no additional gaps located downstream of the Venturi gap 102A, then the lineal distance L1 of the Venturi gap 102A itself may be adjusted to provide higher suction vacuum or higher suction flow rate at a specific set of operating conditions.

Referring generally to FIGS. 1-7, the disclosed evacuator 20 includes a low-cost approach for providing vacuum to a device. Specifically, the evacuator may provide either high suction vacuum or high suction flowrate using a relatively inexpensive and simple approach. The evacuator may also operate as either an aspirator as well as an ejector depending on the specific operating conditions of the engine air system 10. Moreover, the length as well as the offset between the respective inlets and outlets of the gaps may be adjusted in order to provide higher suction vacuum or higher suction flow rate at one or more specific sets of operating conditions.

Figure 8:
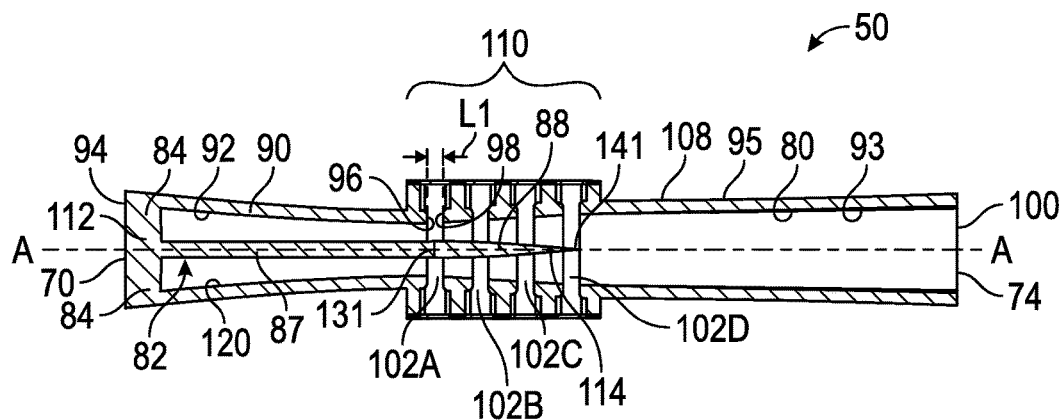
FIG. 8 is a cross sectioned side view of the pneumatically actuated vacuum pump shown in FIG. 2, where the pneumatically actuated vacuum pump includes a fletch insert.

FIG. 8 illustrates the pneumatically actuated vacuum pump 50 having a fletch insert 82. The fletch insert 82 may be an insert located within the pneumatically actuated vacuum pump 50. In an embodiment, the fletch insert 82 may be constructed of plastic. The fletch insert 82 may include two projections 84, a shaft portion 87, and a tapered portion 88. As explained in greater detail below, the fletch insert 82 may be used to reduce the motive flow rate required by the evacuator 20 in order to produce a specific amount of vacuum that is supplied to the vacuum canister 30 (FIG. 1). Furthermore, although FIGS. 1 and 2 illustrate a boosted engine, it is to be understood that the disclosed fletch insert 82 may be part of a pneumatically actuated vacuum pump for a normally aspirated or non-boosted engine system as well.

Figure 9:
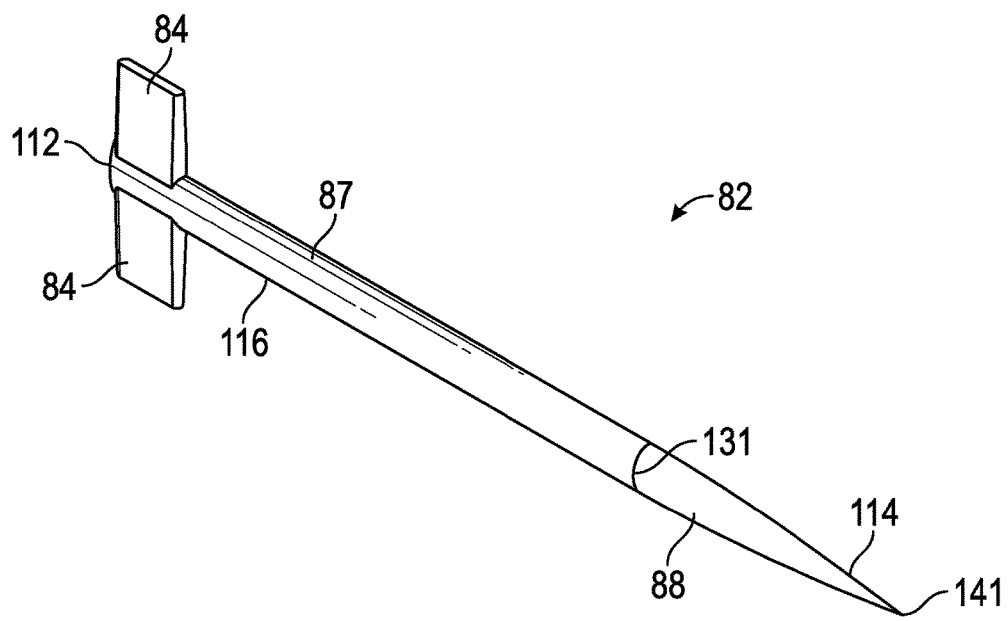
FIG. 9 is a perspective view of the fletch insert shown in FIG. 8.

Referring to both FIGS. 8 and 9, the fletch insert 82 may include a first end 112 and a second end 114. The two projections 84 may be positioned at the first end 112 of the fletch insert 82, and extend in a longitudinal direction along the shaft portion 87 of the fletch insert 82. The projections 84 may also project outwardly from an outermost surface 116 of the shaft 87. The two projections 84 may be used to position the fletch insert 82 within the first tapering portion 92 of the passageway 80 of the pneumatically actuated vacuum pump 50. Specifically, the two projections 84 may be used to substantially align the shaft 87 of the fletch insert 82 along the longitudinal axis A-A (i.e., the central axis of symmetry) of the pneumatically actuated vacuum pump 50. As seen in FIG. 8, the projections 84 may abut against an inner surface 120 of the first tapering portion 92 of the passageway 80 adjacent the motive port 70 of the pneumatically actuated vacuum pump 50. The abutment between the projections 84 and the inner surface 120 of the first tapering portion 92 of the passageway 80 secures the fletch insert 82 within the first tapering portion 92 of the passageway 80 of the pneumatically actuated vacuum pump 50.

FIG. 10 illustrates two projections 84 spaced about one hundred and eighty degrees apart from one another. In particular, one of the projections 84 may be placed along an upper portion 122 of the fletch insert 82 (i.e., at the twelve o'clock position) and a remaining one of the projections may be placed along a bottom portion 124 of the fletch insert 82 (i.e., at the six o'clock position). However, those skilled in the art will readily appreciate that this illustration is merely exemplary in nature, and the projections 84 of the fletch insert 82 may be arranged in other configurations as well. For example, in an alternative embodiment, the projections 84 may be placed at the three o'clock position and the nine o'clock position along the shaft portion 87. Moreover, in an alternative embodiment, the fletch insert 82 may include more than two projections 84, or a single projection 84 may attach to the fletch inset 82 to the passageway 80.

Figure 10A:
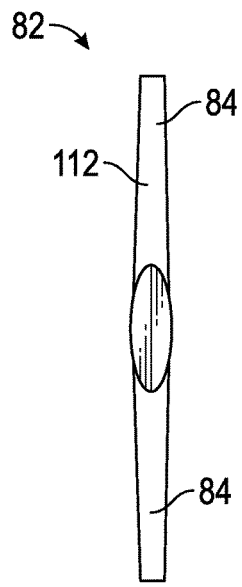
FIG. 10A is an illustration of the fletch insert shown in FIG. 8 when viewed at a first end.
Figure 10B:
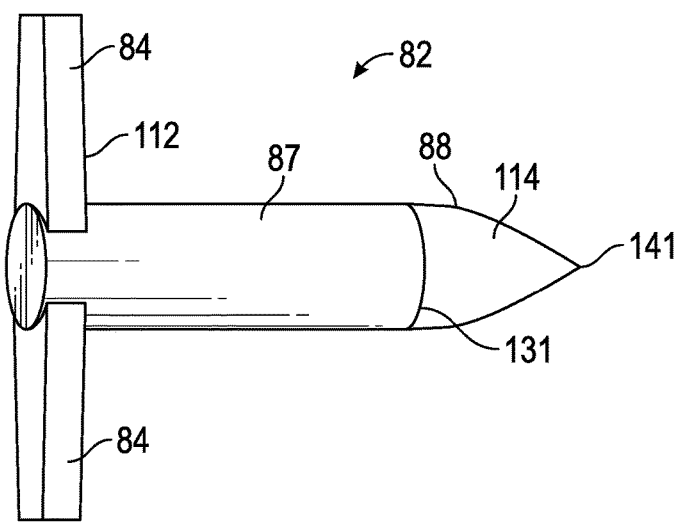
FIG. 10B is an angled view of the fletch insert shown in FIG. 10A.
Figure 10C:
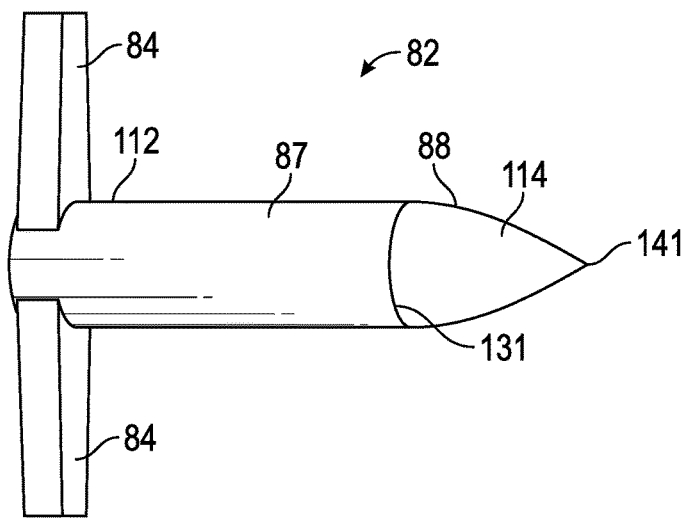
FIG. 10C is a side view of the fletch insert shown in FIG. 10A.
Figure 10D:
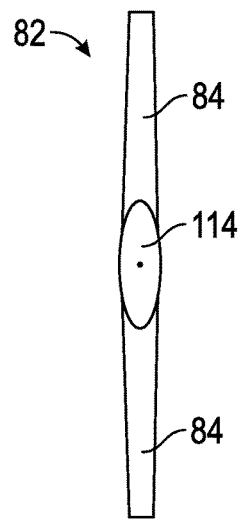
FIG. 10D is an illustration of the fletch insert shown in FIG. 10A when viewed at a second end.

FIGS. 10A-10D illustrate various views of the fletch insert 82. Specifically, FIG. 10A is a view of the fletch insert 82 viewed at the first end 112, FIG. 10B is an angled view of the fletch insert 82, FIG. 11C is a second angled view of the fletch insert 82, and FIG. 11D is a view of the fletch insert 82 at the second end 114. Referring to FIGS. 9 and 10A-10D, the shaft 87 of the fletch insert 82 includes a substantially elliptical cross-sectional area. However, those skilled in the art will readily appreciate that the shaft 87 is not limited to an elliptical cross-sectional area. For example, in another embodiment, the shaft 87 may be substantially circular, or in the shape of a polygon. The elliptical cross-sectional area of the shaft 87 may extend along a length of the fletch insert 82 until the shaft 87 reaches a transition line 131. The fletch insert 82 gradually tapers off and terminates at a point 141 after the transition line 131. The area or section where the fletch insert 82 gradually tapers off into the point 141 is the tapered portion 88.

In the exemplary embodiment as shown in the FIGS. 9 and 10A-10D, the tapered portion 88 of the fletch insert 82 is shaped as an airfoil. Specifically, in the embodiment as shown in the figures, the tapered portion 88 of the shaft 87 is based on a National Advisory Committee for Aeronautics (NACA) airfoil approximated by a fifth order polynomial. However, it is to be understood that this illustration is merely exemplary in nature, and the tapered portion 88 may be shaped as a variety of different airfoils. For example, the airfoil may be approximated using a linear function, or a second order, third order, or higher order polynomial as well.

As seen in FIGS. 9 and 10A-10D, the tapered portion 88 of the fletch insert 82 terminates at the point 141. However, those skilled in the art will readily appreciate the tapered portion 88 usually terminates as a chamfered edge when manufactured. This is because the fletch insert 82 is typically a plastic component that is manufactured using an injection molding process. Indeed, those skilled in the art understand that the point 141 may be relatively difficult or impractical to produce using injection molding technologies, and therefore the fletch insert 82 typically terminates at a chamfered edge and not a point.

Referring back to FIG. 8, the tapered portion 88 of the fletch insert 82 may extend longitudinally within the Venturi area 110 of the pneumatically actuated vacuum pump 50. For example, as seen in FIG. 3, the transition line 131 of the fletch insert 82 is located within the Venturi gap 102A. In other words, the tapered portion 88 of the fletch insert 82 begins in the Venturi gap 102A. The point 141 of the fletch insert 82 may be located within the gap 102D. That is, the fletch insert 82 terminates at the very last gap located within the Venturi area 110 of the pneumatically actuated vacuum pump 50. It is to be understood that the illustration of the pneumatically actuated vacuum pump 50 illustrated in FIG. 8 is merely exemplary in nature, and that the tapered portion 88 of the fletch insert 82 may begin and terminate in any of the gaps 102A, 102B, 102C, or 102D.

Although FIG. 8 shows the tapered portion 88 of the fletch insert 82 positioned within the Venturi area 110, it is to be understood this illustration is exemplary in nature. The tapered portion 88 does not necessarily need to be located within the Venturi area 110 of the pneumatically actuated vacuum pump 50. In an alternative embodiment the transition line 131 of the fletch insert 82 may be located either before the Venturi area 110 (i.e., within the first tapering portion 92 of the passageway 80), or after the Venturi area 110 (i.e., within the second tapering portion 93 of the passageway 80). Moreover, the fletch inert 82 may terminate at any location along the length of the pneumatically actuated vacuum pump 50 (i.e., the point 141 may be located at any position within the pneumatically actuated vacuum pump 50). For example, in one embodiment the transition line 131 of the fletch insert 82 may be located within the second tapering portion 93, and the point 141 may be located at the outlet end 100 of the second tapering portion 93. In other words, the fletch insert 82 may terminate at the discharge port 74 of the pneumatically actuated vacuum pump 50.

Figure 11:
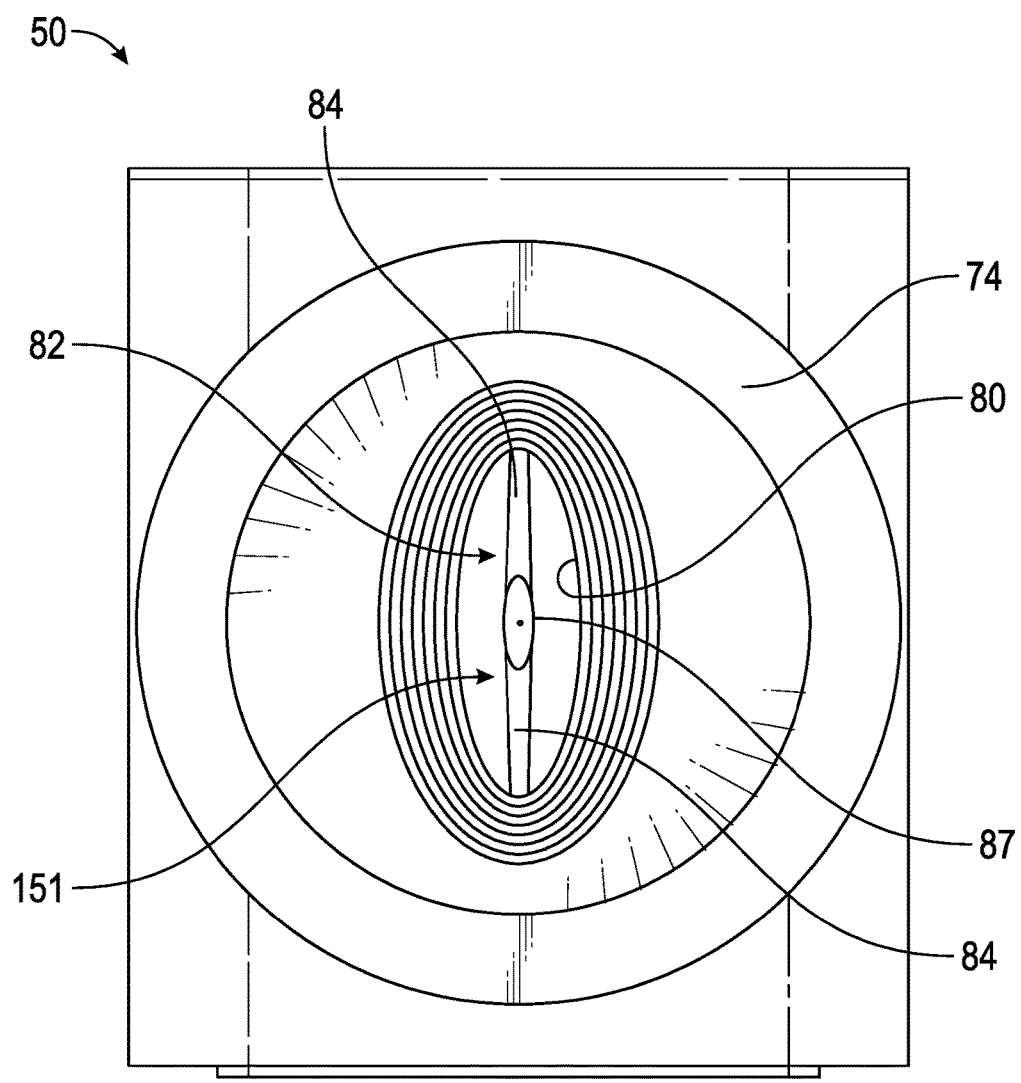
FIG. 11 is an illustration of the pneumatically actuated vacuum pump shown in FIG. 8 when viewed from a discharge port.

The fletch insert 82 may provide various advantages and benefits during operation of the pneumatically actuated vacuum pump 50. First of all, the fletch insert 82 may decrease the amount of motive flow or air flow required by the pneumatically actuated vacuum pump 50 in order to generate a specific amount of suction. This means that the pneumatically actuated vacuum pump 50 requires less air flow than an evacuator that does not include a fletch insert in order to create the same amount of vacuum. FIG. 11 is an illustration of the pneumatically actuated vacuum pump 50, when viewed from the discharge port 74. As seen in FIG. 11, the shaft 87 of the fletch insert 82 fills up or blocks off a centrally located volume 151 located within the passageway 80 of the pneumatically actuated vacuum pump 50. Thus, the motive flow entering the pneumatically actuated vacuum pump 50 does not fill the central area of the passageway 80. This results in less air that is required to enter the motive port 70 (FIG. 8) of the pneumatically actuated vacuum pump 50 in order to generate the same amount of suction in the vacuum canister 30 when compared to an evacuator that does not include a fletch insert.

Referring generally to FIGS. 8, 9 and 11, the tapered portion 88 of the fletch insert 82 may also provide various advantages and benefits as well. In particular, the tapered portion 88 may substantially decrease the amount of turbulence that would be created if the fletch insert 82 did not include the tapered portion 88, and was to instead end abruptly at the transition line 131 (seen in FIG. 4) instead. Moreover, the tapered portion 88 of the fletch insert 82 may also reduce the amount or occurrence of choked flow within the Venturi area 110 of the pneumatically actuated vacuum pump 50.

Figure 12:
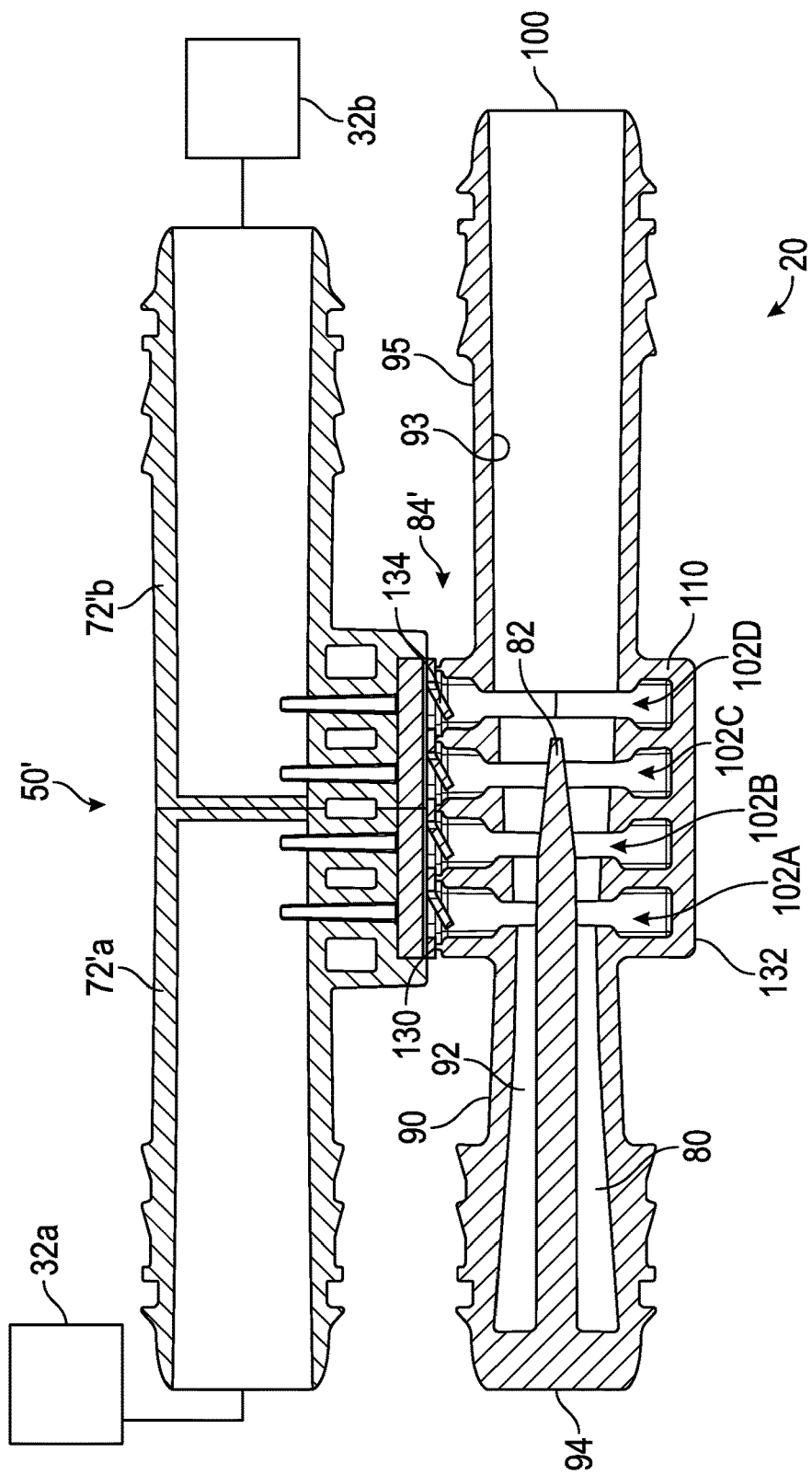
FIG. 12 is a longitudinal cross-sectional view of another embodiment of an evacuator.

FIGS. 12 and 13 illustrate two alternate embodiments of the evacuator 20 where the first and second Venturi gaps 102A and 102B are in fluid communication with a first suction port 72'a, 72'c, respectively, and the second and third Venturi gaps 102C and 102D are in fluid communication with the second suction port 72'b, 72'd, respectively. The fluid communication is controlled by the presence of a check valve element 134 and/or 140, if present. The first suction ports 72'a, 72'c are connected to a first device requiring vacuum 32a and the second suction ports 72'b, 72'd are connected to a second device requiring vacuum 32b.

In one embodiment, the first device requiring vacuum 32a is a brake boost canister and the second device requiring vacuum 32b is a fuel vapor purge canister. As shown in both FIGS. 12 and 13, the first and second Venturi gaps 102A and 102B are positioned closer to the motive exit. This position of the Venturi gaps is advantageous for higher vacuum suction, which is desirable for a brake boost system, when compared to Venturi gaps closer to the outlet end 100 of the discharge section 95. Moreover, as explained above, the first and second Venturi gaps 102A and 102B may be tuned for higher vacuum suction by decreasing the lineal distance L1 and/or decreasing the first offset 1 and/or the second offset 2. In the present embodiment, the third and fourth Venturi gaps 102C and 102D are positioned closer to the outlet end 100 of the discharge section 95. This specific position of the Venturi gaps may be advantageous for higher suction flow rate, typically for a longer time, which is desirable for a fuel vapor purge canister, compared to the first and second Venturi gaps 102A and 102B. Moreover, as explained above, the third and fourth Venturi gaps 102C and 102D can be tuned for higher suction flow rates by increasing the lineal distance L3 and/or L4 and/or increasing the third offset 3 and/or the fourth offset 4.

In another dedicated suction port embodiment, the first device requiring vacuum 32a is a turbocharger bypass pneumatic actuator and the second device requiring vacuum 32b is a fuel vapor purge canister. Here, as shown in both FIGS. 12 and 13, the first and second Venturi gaps 102A and 102B are connected to the first device requiring vacuum and are positioned closer to the motive exit. This position of the Venturi gaps is advantageous for higher vacuum suction, which is desirable for a turbocharger bypass pneumatic actuator. Moreover, as explained above, the first and second Venturi gaps 102A and 102B may be tuned for higher vacuum suction by decreasing the lineal distance L1 and/or decreasing the first offset 1 and/or the second offset 2. Moreover, if additional vacuum is needed to operate the turbocharger bypass pneumatic actuator, the third Venturi gap 102C may also be in fluid communication with only the first suction port 72'a, 72'c. Accordingly, the third and fourth Venturi gaps 102C and 102D or the fourth Venturi gap 102D alone, or the fourth Venturi gap 102D and one or more additional Venturi gaps (not shown) may be in fluid communication with the second device requiring vacuum 32b. This position of the Venturi gaps, which is closer to the outlet end 100 of the discharge section 95, is advantageous for higher suction flow rate, typically for a longer time, which is desirable for a fuel vapor purge canister. Moreover, as explained above, these Venturi gaps may be tuned for higher suction flow rates by increasing their respective lineal distances and/or increasing the their respective offsets 3.

It is to be understood that various combination of devices are possible for the first and second devices requiring vacuum 32a, 32b and further that a third and/or fourth device requiring vacuum may be connected to the same evacuator as well by additional suction ports, as explained above. Depending upon the number of devices requiring vacuum and the type of devices, the Venturi gaps 102A, 102B, 102C, 102D connected to the respective devices should be chosen depending upon the device's need for high or low suction vacuum and high or low suction flow rate and the same may be adjusted or tuned to those needs. For example, in one embodiment, one of the Venturi gaps 102A, 102B, 102C, 102D may be increased in length to provide a higher suction flow rate at a first set of operating conditions, and the remaining Venturi gaps 102A, 102B, 102C, 102D may be decreased in length to provide a higher suction vacuum at another set of operating conditions.

Referring to FIG. 13, the fluid communication between the Venturi gaps 102A-102D is controlled by the presence of check valve elements 134, 140. Here, since only the first and second Venturi gaps 102A and 102B fluidly communicate with the first suction port 72'c, an obstruction 204 is present that obstructs (prevents) fluid communication between any downstream Venturi gaps and the first suction port 72'c. Similarly, since only the third and fourth Venturi gaps 102C and 102D fluidly communication with the second suction port 72'd, an obstruction 202 is present that obstructs or prevents fluid communication between any upstream Venturi gaps and the second suction port 72'd.

In an alternate embodiment as illustrated in FIG. 14, rather than having obstructions 202 or 204 coordinated with selected Venturi gaps, a check valve element 208 may be used instead. In the embodiment as shown in FIG. 14, the check valve element 208 includes selected tabs thereof that are rigid, those included on the right section 212, and other selected tabs that are elastically flexible, those included on the left section 210, to move between a closed position and an open position. While the check valve element 208 is illustrated as having one-half rigid tabs and one-half flexible tabs, it is to be understood that the rigid and flexible tabs may be dispersed as required to coordinate with selected Venturi gaps and their respective suction ports. Furthermore, as seen in FIG. 13 the fletch insert 82, which is described in detail above, may be included in any of the embodiments disclosed herein.

Referring to FIGS. 12-14, the evacuator 20 includes a low-cost approach for providing vacuum to a device. Specifically, the evacuator 20 shown in FIGS. 12-13 may provide either high suction vacuum or high suction flow rate using a relatively inexpensive and simple approach. The evacuator may also operate as either an aspirator as well as an ejector depending on the specific operating conditions of the engine air system 10. Moreover, the length as well as the offset between the respective inlets and outlets of the Venturi gaps may be adjusted in order to provide higher suction vacuum or higher suction flow rate at one or more specific sets of operating conditions.

Figure 15:
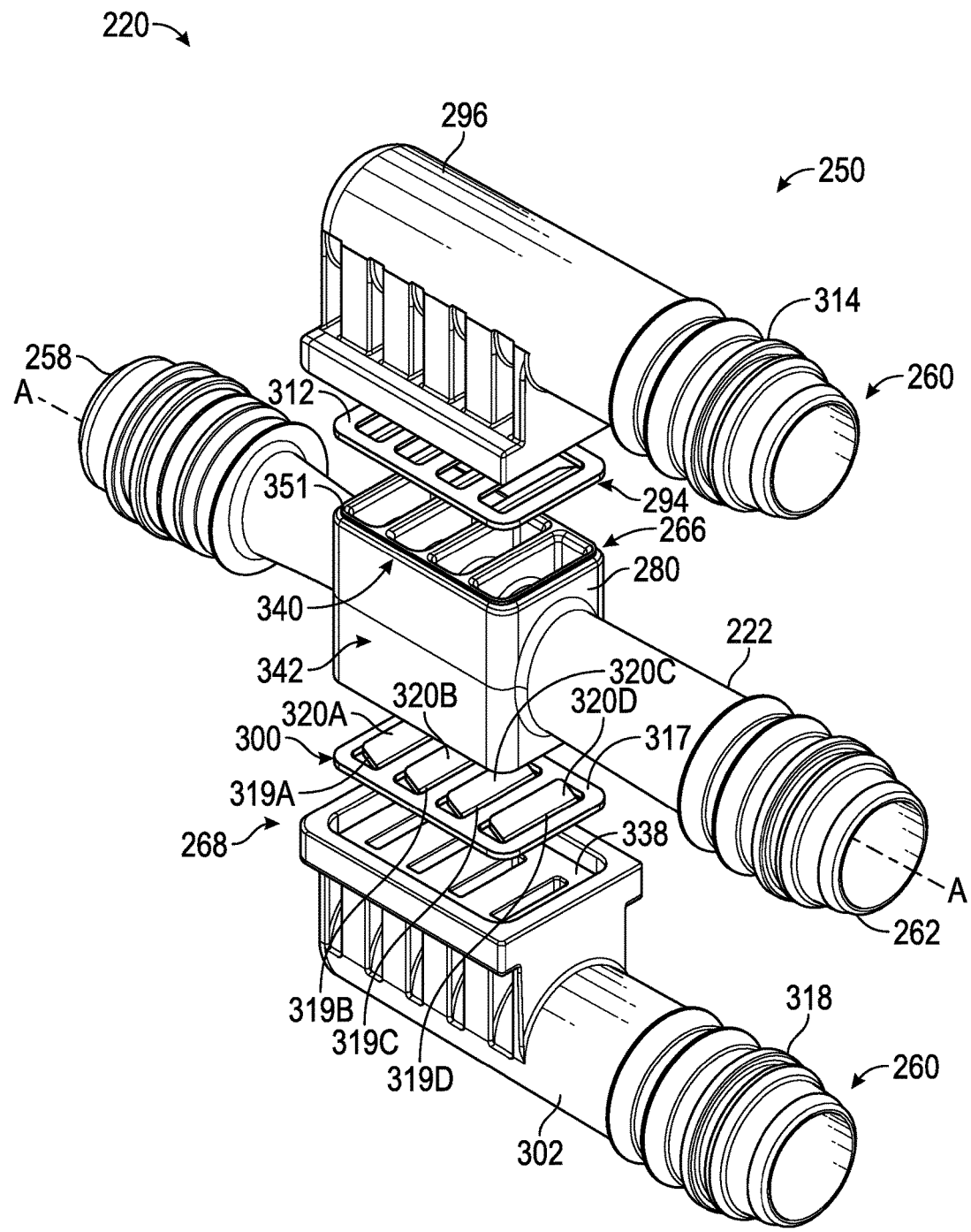
FIG. 15 is an exploded view of another embodiment of the pneumatically actuated vacuum pump, including a body, at least one suction cap, and a check valve element.
Figure 16:
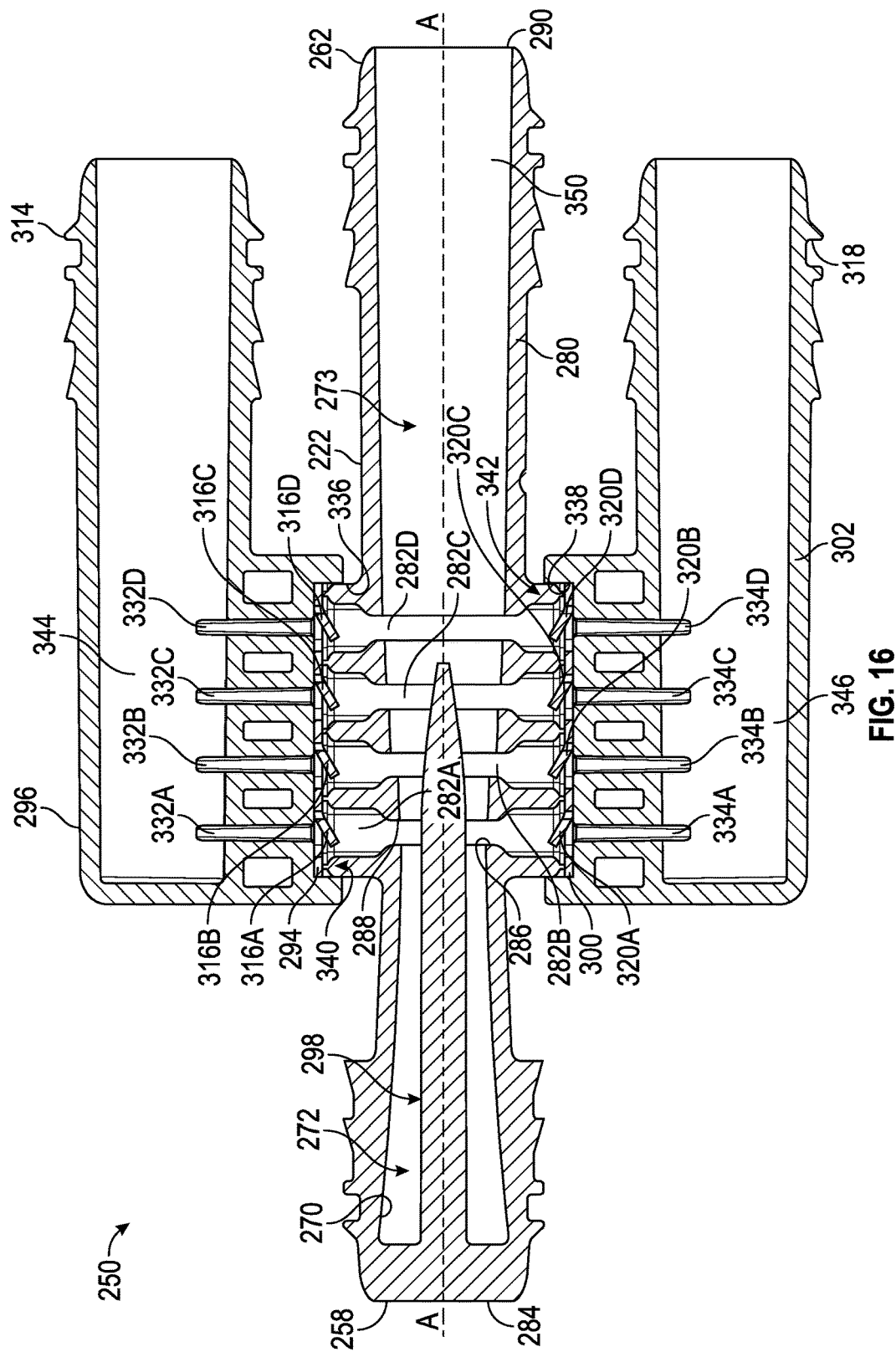
FIG. 16 is a cross-sectioned view of the pneumatically actuated vacuum pump shown in FIG. 15.

FIGS. 15-16 illustrate another embodiment of an evacuator 220 having check valves 294, 300 that may provide an integral seal, which is explained in greater detail below. A pneumatically actuated vacuum pump 250 may define a body 222, which a passageway 350 (shown in FIG. 16) that extends along the axis A-A. In the embodiment as illustrated, the body 222 of the pneumatically actuated vacuum pump 250 includes four ports that are connectable to subsystems of the internal combustion engine 12 (FIG. 1). Specifically, referring to FIGS. 1 and 15-16, a motive port 258 is fluidly connected to and supplies compressed air from the compressor 24, two suction ports 260 are fluidly connected to the vacuum canister 30, and a discharge port 262 fluidly connected to and discharges air to either the atmosphere or a pressure lower than boost pressure.

Although a boosted engine is illustrated in FIG. 1, it is to be appreciated that the pneumatically actuated vacuum pump 250 may operate in a non-boosted system as well. However, the four ports will connect to different subsystems of a normally aspirated internal combustion engine. Specifically, the motive port 258 is supplied clean air at atmosphere, the suction ports 260 are connected to the vacuum canister 30, and the discharge port 262 is connected to an engine intake manifold of a non-boosted engine downstream of the throttle 28.

In the non-limiting embodiment as shown, the pneumatically actuated vacuum pump 250 includes two suction ports 260, where one of the suction ports 260 is located along a top portion 266 of the pneumatically actuated vacuum pump 250 and the remaining suction port 260 is located along a bottom portion 268 of the pneumatically actuated vacuum pump 250. However, it is to be understood that in another embodiment only one suction port 260 located along either the top portion 266 or the bottom portion 268 of the pneumatically actuated vacuum pump 250 may be used as well.

Referring to FIG. 16, the passageway 350 of the pneumatically actuated vacuum pump 250 may include a first tapering portion 272 (also referred to as a motive cone) in a motive section 270 of the passageway 350. The passageway 250 may also include a second tapering portion 273 (also referred to as a discharge cone) in a discharge section 272 of the passageway 350. The first tapering portion 272 of the passageway 350 may include an inlet end 284 and an outlet end 286. Similarly, the second tapering portion 273 of the passageway 350 may also include an inlet end 288 and an outlet end 290.

As seen in FIG. 16, the first tapering portion 272 of the pneumatically actuated vacuum pump 250 may be fluidly coupled to the second tapering portion 273 by a Venturi gap 282A. In the embodiment as shown in FIG. 16, the pneumatically actuated vacuum pump 50 also includes a fletch insert 298 that is substantially aligned with the axis A-A (i.e., central axis of symmetry) of the pneumatically actuated vacuum pump 250. However, it is to be understood that the fletch insert 298 may be omitted from the pneumatically actuated vacuum pump 250 if desired.

In the embodiment as shown in FIGS. 15-16, the pneumatically actuated vacuum pump 250 includes a total of four gaps, where three gaps 282B, 282C, 282D are located downstream of the Venturi gap 282A. It is to be understood that this illustration is merely one exemplary embodiment of the pneumatically actuated vacuum pump 250. Those skilled in the art will readily appreciate that any number of gaps may be located downstream of the Venturi gap 282A. The body 222 of the pneumatically actuated vacuum pump 250 may define a body 280. The body 280 may surround a portion of the second tapering portion 273 of the pneumatically actuated vacuum pump 250, and contain the gaps 282A, 282B, 282C, 282D therein. In the embodiment as illustrated, the body 280 may include a generally rectangular profile, however the body 280 is not limited to a rectangular profile.

Each gap 282A, 282B, 282C, 282D may be a void located within the body 280. Specifically, gaps 282A, 282B, 282C, 282D may each be similar to an interior cross-section of the body 280. The pneumatically actuated vacuum pump 250 includes an upper suction cap 296 and a lower suction cap 302. The upper suction cap 296 may include a barb 314 and the lower suction cap 302 may include a barb 318 for mating with a hose (not illustrated) that connects the suction ports 260 to the vacuum canister 30 (FIG. 1). Both the upper suction cap 296 and the lower suction cap 302 may be plastic welded or otherwise permanently joined to the body 280 of the pneumatically actuated vacuum pump 250 during assembly.

The upper suction cap 296 and the lower suction cap 302 both define respective recesses 336 and 338. Specifically, the upper suction cap 296 defines an upper recess 336 and the lower suction cap 302 defines a lower recess 338. The body 280 of the pneumatically actuated vacuum pump 250 includes an upper mating section 340 and a lower mating section 342. The upper recess 336 of the upper suction cap 296 is sized and shaped to receive the upper mating section 340 of the body 280. Likewise, the lower recess 338 of the lower suction cap 302 is sized and shaped to receive the lower mating section 342 of the body 280. Referring to FIG. 16, when the pneumatically actuated vacuum pump 250 is assembled, the passageway 350 of the body 280 is fluidly connected to a passageway 344 of the upper suction cap 296. Likewise, when the pneumatically actuated vacuum pump 250 is assembled the passageway 350 of the body 280 is fluidly connected to a passageway 346 of the lower suction cap 302.

Referring to FIGS. 15-16, the upper check valve element 294 may be located between upper mating section 340 of the body 280 and the upper recess 336 of the upper suction cap 296. Similarly, the lower check valve element 300 may be located between the lower mating section 342 of the body 280 and the lower recess 338 of the lower suction cap 302. As explained in greater detail below, the upper check valve element 294 may create a substantially fluid-tight seal between the upper mating section 340 of the body 280 and the upper mating section 340 of the upper suction cap 296. Likewise, the lower check valve element 300 may also create a substantially fluid-tight seal between the lower mating section 342 of the body 280 and the lower recess 338 of the lower suction cap 302.

Figure 17:
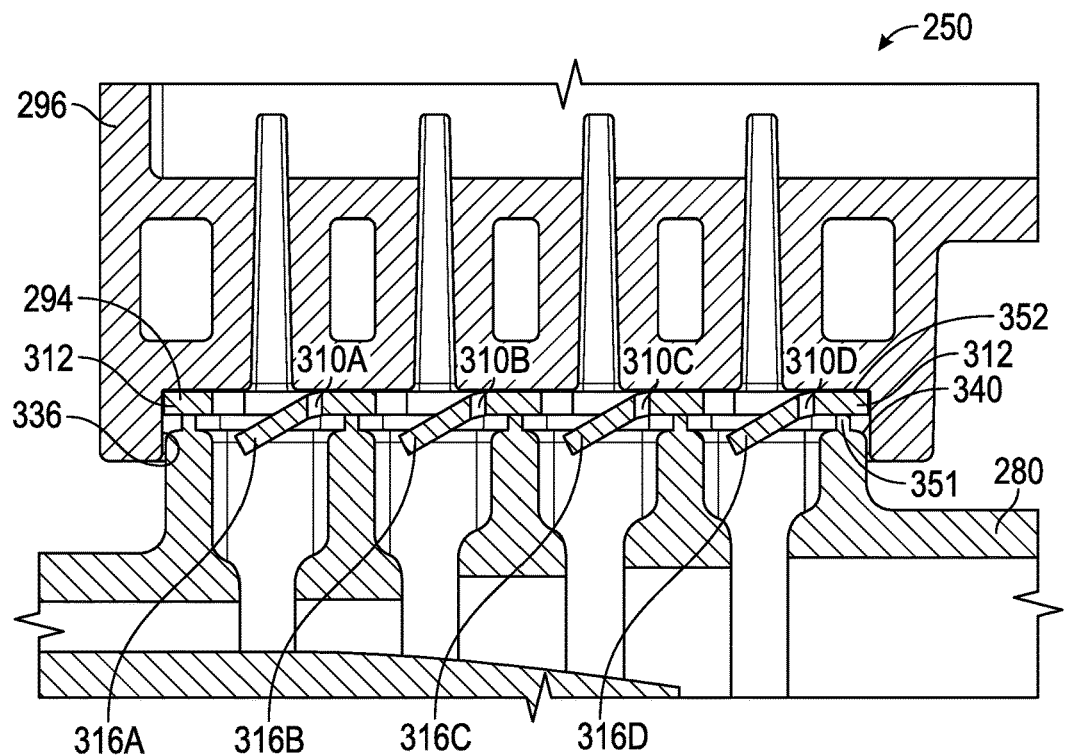
FIG. 17 is an enlarged view of the pneumatically actuated vacuum pump shown in FIG. 15 illustrating the check valve element located between the body and one of the suction caps.
Figure 18:
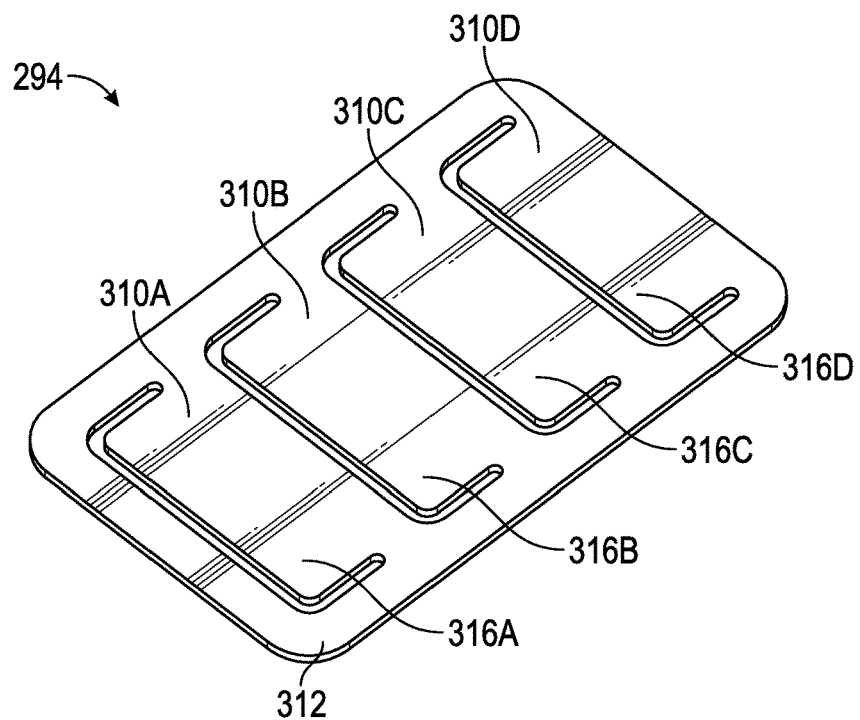
FIG. 18 is an enlarged, perspective view of the check valve element shown in FIG. 15.

The upper check valve element 294 and the lower check valve element 300 may be constructed of a relatively flexible material such as, for example, an elastomer. The flexible material enables the upper check valve element 294 and the lower check valve element 300 to bend or deform during operation of the pneumatically actuated vacuum pump 250. Turning now to FIG. 17, an enlarged view of the upper check valve element 294 seated within the pneumatically actuated vacuum pump 250 is illustrated. FIG. 18 is an enlarged, perspective view of the upper check valve element 294 shown in FIG. 17. Those skilled in the art will readily understand that the upper check valve element 294 and the lower check valve element 300 may be substantially identical to one another, thus the description pertaining to the upper check valve element 294 and the upper suction cap 296 may also apply to the lower check valve 300 as well as the lower suction cap 296.

Referring generally to FIGS. 15-18, the upper check valve 294 may include a plurality of hinges 310A, 310B, 310C, 310D (the hinges are best seen in FIG. 18). The hinges 310A, 310B, 310C, 310D of the upper check valve element 294 may be substantially transverse with respect to the axis A-A of the pneumatically actuated vacuum pump 250. A plurality of flaps 316A, 316B, 316C, 316D each correspond to one of the hinges 310A, 310B, 310C, 310D of the upper check valve element 294. The hinges 310A, 310B, 310C, 310D may also be connected to an outermost periphery 312 of the upper check valve element 294 (seen in FIG. 18). As seen in FIG. 15, the lower check valve element 300 also includes an outermost periphery 317, a plurality of hinges 319A, 319B, 319C, 319D, and a plurality of flaps 320A, 320B, 320C, 320D.

Referring to FIGS. 17 and 18, the outermost periphery 312 of the upper check valve element 294 creates the substantially fluid-tight seal between the upper mating section 340 of the body 280 and the upper recess 336 of the upper suction cap 296. Specifically, the outermost periphery 312 of the upper check valve element 294 is compressed between edge 351 located around a periphery of the upper mating section 140 of the body 280 (also seen in FIG. 2) and a lower surface 352 of the upper mating section 340 of the upper suction cap 296. The compression of the upper check valve element 294 creates a substantially fluid-tight seal between the body 280 and the upper suction cap 296. Thus, the outermost periphery 312 of the upper check valve element 294 may function as a seal bead between the body 280 and the upper suction cap 296 when the body 280, the upper suction cap 296, and the upper check valve element 294 are assembled together. It is to be understood while the upper check valve element 294 is discussed, the lower check valve element 300 (shown in FIGS. 15 and 16) also provides a similar fluid-tight seal between the body 280 and the lower suction cap 302.

Turning back to FIGS. 15 and 16, each of the flaps 316A, 316B, 316C, 316D of the upper check valve element 294 may correspond to and is fluidly connected to one of the gaps 282A, 282B, 282C, 282D. Similarly, each of the flaps 320A, 320B, 320C, 320D of the lower check valve element 300 may also correspond to and is fluidly connected to one of the gaps 282A, 282B, 282C, 282D. The upper suction cap 296 may include a plurality of apertures 332A, 332B, 332C, 332D that correspond to one of the flaps 316A, 316B, 316C, 316D of the upper check valve element 294. Each aperture 332A, 332B, 332C 332D may be used to fluidly connect a corresponding one of the gaps 282A, 282B, 282C, 282D with the passageway 344 of the upper suction cap 296, as well as the vacuum canister 30 (FIG. 1). Similarly, the lower suction cap 302 may include a plurality of apertures 334A, 334B, 334C, 334D that correspond to one of the flaps 320A, 320B, 320C, 320D of the lower check valve element 300. Each aperture 334A, 334B, 334C, 334D may be used to fluidly connect a corresponding one of the gaps 282A, 282B, 282C, 282D with the passageway 346 of the lower suction cap 302, as well as the vacuum canister 30 (FIG. 1).

FIG. 16 illustrates both of the check valve elements 294, 300 in a fully opened position. Specifically, referring to FIGS. 15-17, when the upper check valve element 294 is in the fully opened position, each of the flaps 316A, 316B, 316C, 316D deform or bend about the respective hinges 310A, 310B, 310C, 310D inwardly and towards the gaps 282A, 282B, 282C, 282D. The flaps 316A, 316B, 316C, 316D may bend about the hinges 310A, 310B, 310C, 310D and inwardly if the pressure located in the passageway 344 of the upper suction cap 296 is greater than the pressure in the gaps 282A, 282B, 282C, 282D. Specifically, it is appreciated that the upper check valve 294 is flexible enough such that the flaps 316A, 316B, 316C, 316D may bend inwardly along the respective hinges 310A, 310B, 310C, 310D, thereby allowing air located in the passageway 344 of the upper suction cap 296 to be suctioned into the gaps 282A, 282B, 282C, 282D. Similarly, when the pressure located in passageway 346 of the lower suction cap 302 is greater than the pressure in the gaps 282A, 282B, 282C, 282D, the lower check valve element 300 may open. Specifically, the lower check valve 300 is flexible enough such that the flaps 320A, 320B, 320C, 320D may bend inwardly along the respective hinges 319A, 319B, 319C, 319D and towards the gaps 282A, 282B, 282C, 282D, thereby allowing air from the passageway 346 of the lower suction cap 202 to be suctioned into the gaps 282A, 282B, 282C, 282D.

If the pressure located in the passageway 344 of the upper suction cap 296 is equal to or less than pressure in the gaps 282A, 282B, 282C, 282D, the upper check valve element 294 may be seated flush within the upper suction cap 296, and the flaps 316A, 316B, 316C, 316D are not bent about the hinges 310A, 310B, 310C, 310D. Similarly, when pressure located in the passageway 346 of the lower suction cap 302 is equal to or less than pressure in the gaps 282A, 282B, 282C, 282D, the lower check valve element 300 may be seated flush within the lower suction cap 302, and the flaps 320A, 320B, 320C, 320D are not bent. When the check valves 294, 300 are in the closed position, air from the upper and lower suction ports of the pneumatically actuated vacuum pump 250 may not be suctioned into the gaps 282A, 282B, 282C, 282D.

Figure 19:
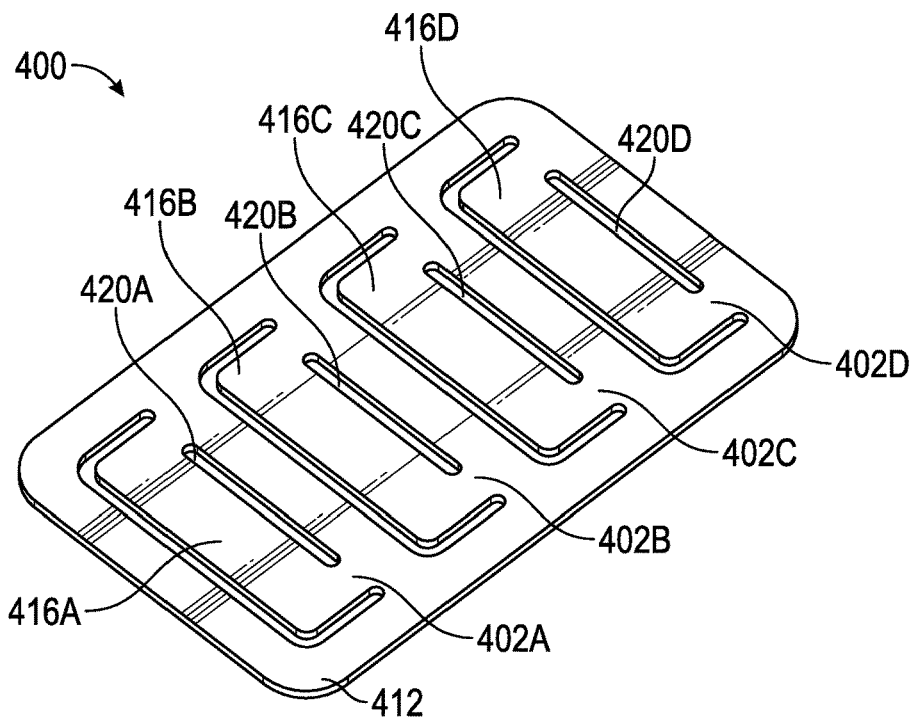
FIG. 19 is an alternative embodiment of the check valve element shown in FIG. 18 including a modified hinge and flap structure.

FIG. 19 is an alternative embodiment of a check valve element 400. In the embodiment as shown, the check valve element 400 also includes four unique hinges 402A, 402B, 402C, 402D that each correspond to a flap 416A, 416B, 416C, 416D. The check valve element 400 may also include an outermost perimeter 412 that also functions as a seal bead between the body 280 and either the upper suction cap 296 or the lower suction cap 302 shown in FIGS. 15-17. However, unlike the check valve elements 294, 300 as seen in FIGS. 15-17, the check valve element 400 also includes respective slits 420A, 420B, 420C, 420D that each extend along the hinges 402A, 402B, 402C, 402D. The slits 420A, 420B, 420C, 420D each enable the respective hinges 402A, 402B, 402C, 402D to bend or deform more easily when compared to the hinges 310A, 310B, 310C, 310D shown in FIG. 18. Thus, those skilled in the art will readily appreciate that less pressure is required within the upper suction cap 296 (or the lower suction cap 302 as seen in FIG. 16) in order for the flaps 416A, 416B, 416C, 416D to bend inwardly about the hinges 402A, 402B, 402C, 402D.

Figure 20:
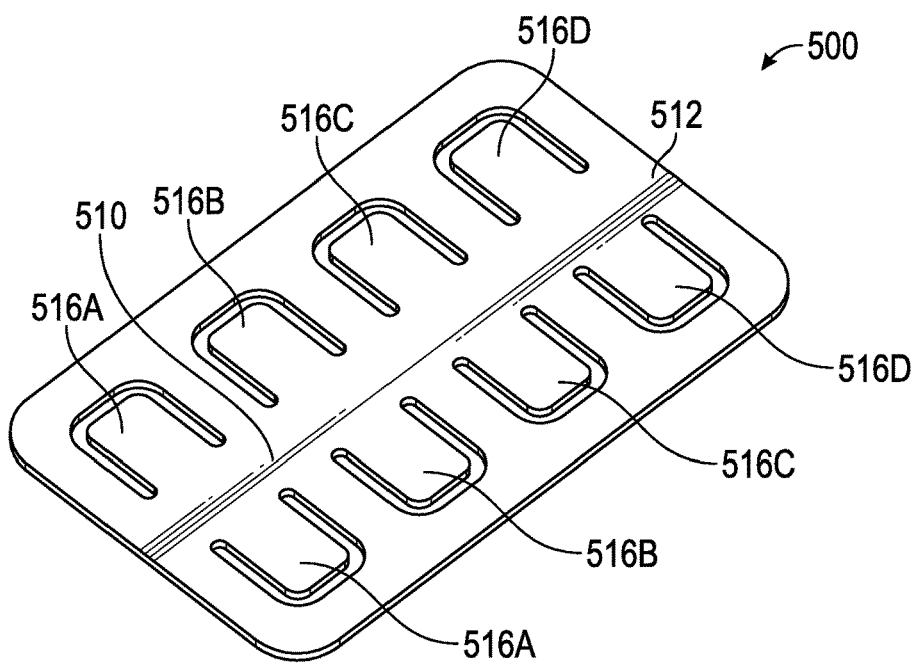
FIG. 20 is another embodiment of the check valve shown in FIG. 19 including a modified hinge structure.

FIG. 20 is another embodiment of a check valve element 500. In the embodiment as shown in FIG. 20, the check valve element 500 includes a main hinge 510. The main hinge 510 may be substantially parallel with the axis A-A of the pneumatically actuated vacuum pump 250 (FIG. 15). A plurality of outwardly projecting fingers or flaps 516A, 516B, 516C, 516D may extend outwardly and in a direction generally transverse with respect to the hinge 510 of the check valve element 500. The hinge 510 may also be attached to an outermost periphery 512 of the check valve element 500.

Referring generally to FIGS. 15-20, the disclosed check valve elements provide an integral seal between the body and the suction caps of the disclosed pneumatically actuated vacuum pump. Those skilled in the art will readily appreciate that providing a built-in seal between the body and the suction caps may relax or make the requirements of a weld joint between the body and the suction caps less rigorous than what is currently required. Specifically, some types of aspirators and evacuators that are currently available require a weld seal that is not only mechanically rigid, but should also provide a robust, fluid-tight seal. However, this requirement may be challenging to meet, and adds to the overall assembly and manufacturing cost of the part. In contrast, the disclosed pneumatically actuated vacuum pump includes relaxed requirements since the check valve elements already provide fluid-tight sealing between the body and the suction caps. Thus, the disclosed pneumatically actuated vacuum pump may result in lower labor and manufacturing costs, since the disclosed check valve elements already provide a built-in seal, without adding additional steps during the assembly process.

The embodiments of this invention shown in the drawings and described above are exemplary of numerous embodiments that may be made within the scope of the appended claims. It is contemplated that numerous other configurations of the disclosure may be created taking advantage of the disclosed approach. In short, it is the applicants' intention that the scope of the patent issuing herefrom will be limited only by the scope of the appended claims.

What is claimed is:

1. A method of tuning a multi-Venturi gap Venturi device that generates vacuum, the method comprising:
providing a test Venturi device having a first suction piece that defines a first suction port and having a body that defines a passageway comprising a first tapering portion having an inlet end and an outlet end and a second tapering portion having an inlet end and an outlet end, wherein the outlet end of the first tapering portion and the inlet end of the second tapering portion are spaced apart a lineal distance to define a first Venturi gap, wherein a plurality of additional Venturi gaps segment the second tapering portion and each of the additional Venturi gaps define a lineal distance between a first opening and second opening thereof, and wherein the first tapering portion converges toward the first Venturi gap and the second tapering portion diverges away from the first Venturi gap;
operating the Venturi device as an aspirator and determining at which of the first Venturi gap and plurality of additional Venturi gaps is a location of minimum pressure for a first pre-selected operating condition;
operating the Venturi device as an ejector and determining at which of the first Venturi gap and plurality of additional Venturi gaps is a location of minimum pressure for a second pre-selected operating condition;
tuning whichever Venturi gap is at the location of minimum pressure as an aspirator to have higher vacuum suction by forming a first tuned Venturi gap having a smaller lineal distance than the same Venturi gap of the test Venturi device; and
tuning whichever Venturi gap is at the location of minimum pressure as an ejector to have a higher suction flow rate by forming a second tuned Venturi gap having a larger lineal distance than the same Venturi gap of the test Venturi device;
wherein the first tuned Venturi gap is not the same as the second tuned Venturi gap.

2. The method of claim 1, wherein the first tuned Venturi is the first Venturi gap.

3. The method of claim 2, wherein each of the plurality of additional Venturi gaps in order downstream of the first Venturi gap are the second Venturi gap and third Venturi gap, and the third Venturi gap is the second tuned Venturi gap.

4. The method of claim 1, wherein all other Venturi gaps relative to the second tuned Venturi gap have a lineal distance that is smaller thereto.

5. The method of claim 3, wherein the suction piece is dived to provide a second suction port, and the first Venturi gap and the second Venturi gap are in fluid communication with the first section port, and the third Venturi gap is in fluid communication with the second suction port; wherein the method further comprises tuning the second Venturi gap to have a higher vacuum suction by decreasing its lineal distance relative to the test Venturi device.

6. The method of claim 5, wherein the plurality of additional Venturi gaps comprise a fourth Venturi gap downstream of the third Venturi gap, and the third and fourth Venturi gaps are in fluid communication with the second suction port; wherein the method further comprises tuning the fourth Venturi gap to have a higher suction flow rate by increasing its lineal distance relative to the test Venturi device.

7. The method of claim 1, wherein the test Venturi device has a fletch insert positioned within the converging motive section of the body of the evacuator extending along a central axis of symmetry of the evacuator.

8. The method of claim 7, wherein the fletch insert defines a tapered portion that gradually tapers off into a point.

9. The method of claim 8, wherein the tapered portion of the fletch insert is shaped as an airfoil.

10. The method of claim 1, wherein the test Venturi device has a check valve element operatively seated between the suction piece and the body to control fluid communication between the suction port and the first Venturi gap and the additional Venturi gaps.

11. The method of claim 10, wherein the check valve element defines a plurality of flaps or tabs that are elastically flexible and correspond one each to one of the first Venturi gap and additional Venturi gaps.

12. The method of claim 11, wherein each of the plurality of flaps or tabs extend outward from one or both sides of a rigid section that is parallel with a longitudinal axis of the check valve element in a direction transverse to the longitudinal axis.

13. The method of claim 11, wherein the plurality of flaps or tabs each have a hinge oriented transverse to a longitudinal axis of the check valve element.

14. The method of claim 1, wherein the test Venturi device comprises a second suction piece defining a second suction port; wherein the first suction piece and the second suction piece are both in fluid communication with each of the first Venturi gap and the plurality of additional Venturi gaps.

15. The method of claim 1, wherein the test Venturi device has an inlet opening profile and outlet opening profile for each of the first Venturi gap and the plurality of Venturi gaps that are elliptical.

16. The method of claim 1, wherein the outlet opening profile of the first Venturi gap is sized to be greater than the inlet opening profile of the first Venturi gap, thereby defining a first offset.

* * * * *